US010887764B1

(12) United States Patent
Mokady et al.

(10) Patent No.: US 10,887,764 B1
(45) Date of Patent: Jan. 5, 2021

(54) AUDIO VERIFICATION

(71) Applicant: Amazon Technologies, Inc., Seattle, WA (US)

(72) Inventors: Ran Mokady, Seattle, WA (US); Samuel Scott Gigliotti, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 101 days.

(21) Appl. No.: 15/714,961

(22) Filed: Sep. 25, 2017

(51) Int. Cl.
*H04W 12/06* (2009.01)
*H04L 9/32* (2006.01)
*H04W 4/14* (2009.01)
*G10L 17/22* (2013.01)
*G10L 15/22* (2006.01)
*G10L 17/00* (2013.01)
*G10L 15/26* (2006.01)

(52) U.S. Cl.
CPC ............ *H04W 12/06* (2013.01); *G10L 15/22* (2013.01); *G10L 15/26* (2013.01); *G10L 17/00* (2013.01); *G10L 17/22* (2013.01); *H04L 9/3242* (2013.01); *H04L 9/3247* (2013.01); *H04W 4/14* (2013.01); *G10L 2015/223* (2013.01); *H04L 2209/80* (2013.01)

(58) Field of Classification Search
CPC ....... G10L 15/22; G10L 15/265; G10L 17/00; G10L 17/22; G10L 2015/223; H04L 2209/80; H04L 9/3242; H04L 9/3247; H04W 12/06; H04W 4/14
See application file for complete search history.

(56) References Cited

U.S. PATENT DOCUMENTS

| 2005/0010777 | A1* | 1/2005 | Gantman | G06Q 20/3821 |
| | | | | 713/176 |
| 2012/0123887 | A1* | 5/2012 | Aihara | G06Q 30/0601 |
| | | | | 705/26.1 |
| 2015/0113615 | A1* | 4/2015 | Foster | H04W 12/06 |
| | | | | 726/5 |
| 2015/0222615 | A1* | 8/2015 | Allain | H04L 63/08 |
| | | | | 726/4 |
| 2016/0072803 | A1* | 3/2016 | Holz | G06F 21/42 |
| | | | | 726/7 |
| 2017/0262845 | A1* | 9/2017 | Eisen | G06Q 20/401 |

(Continued)

OTHER PUBLICATIONS

M. Ichino, Y. Yamazaki and H. Yoshiura, "Speaker verification method for operation system of consumer electronic devices," in IEEE Transactions on Consumer Electronics, vol. 61, No. 1, pp. 96-102, Feb. 2015. (Year: 2015).*

(Continued)

*Primary Examiner* — Theodore C Parsons
(74) *Attorney, Agent, or Firm* — Lowenstein Sandler LLP

(57) ABSTRACT

Techniques for enabling a system to verify that contact data are to be added to a user account are described. A system receives message data. The system generates first audio data that includes a representation of a verification code. The system sends a message comprising the audio data to a first device. The system receives, from a second device, second audio data that represents the first audio data. The system confirms that the second audio data included a representation of the verification code, and then verifies that the contact data is to be added to the user account.

20 Claims, 15 Drawing Sheets

(56) References Cited

U.S. PATENT DOCUMENTS

2017/0331807 A1\* 11/2017 Mont-Reynaud .............................. H04W 12/0802
2019/0243961 A1\* 8/2019 Ollivier ................. H04L 9/3226

OTHER PUBLICATIONS

Moon, M. "Two-factor system uses ambient sounds to verify your login" uploaded Aug. 16, 2015 on engaget.com; printed from https://www.engadget.com/2015/08/16/sound-proof-two-factor/ on Sep. 25, 2017, 2 pages.

\* cited by examiner

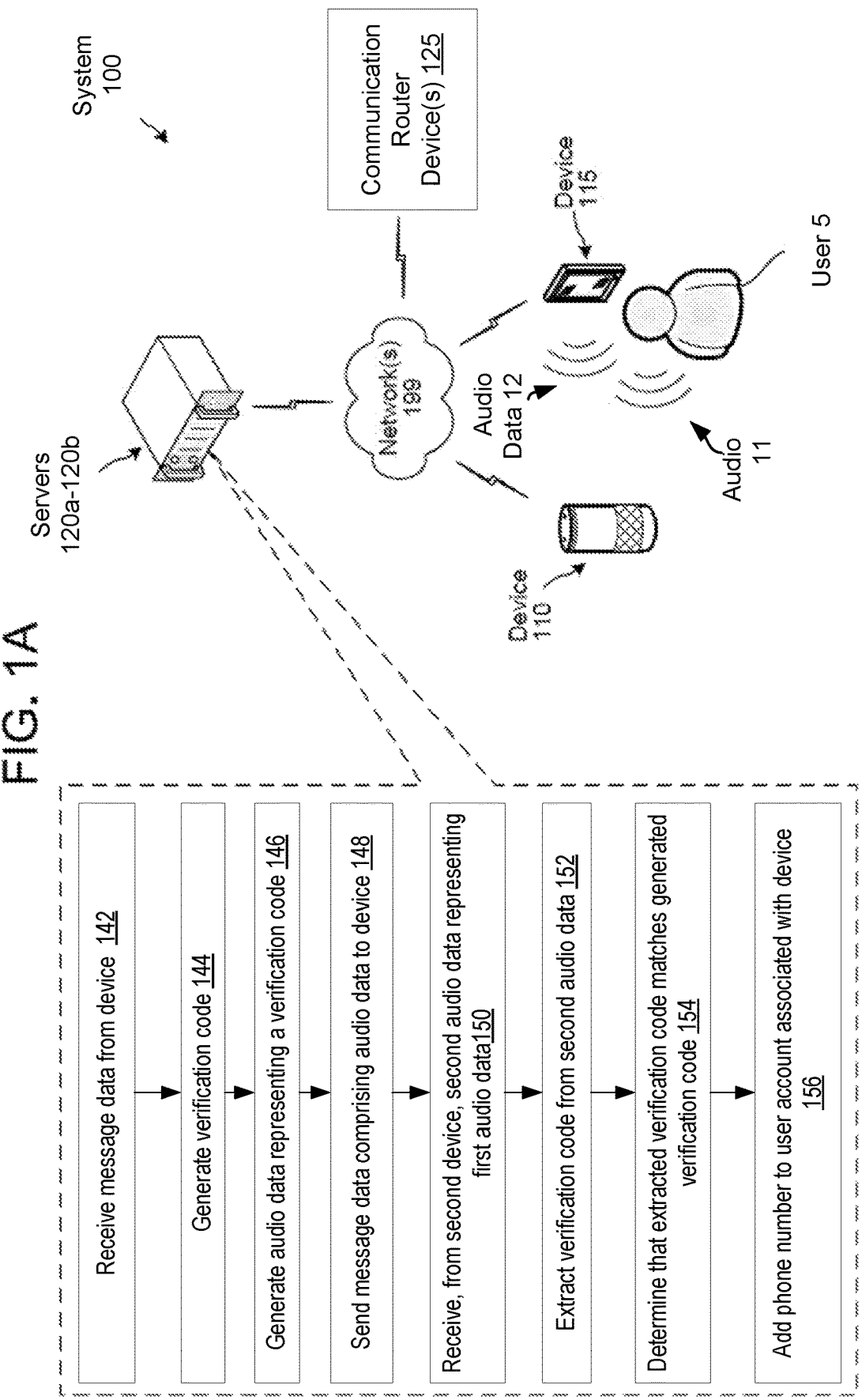

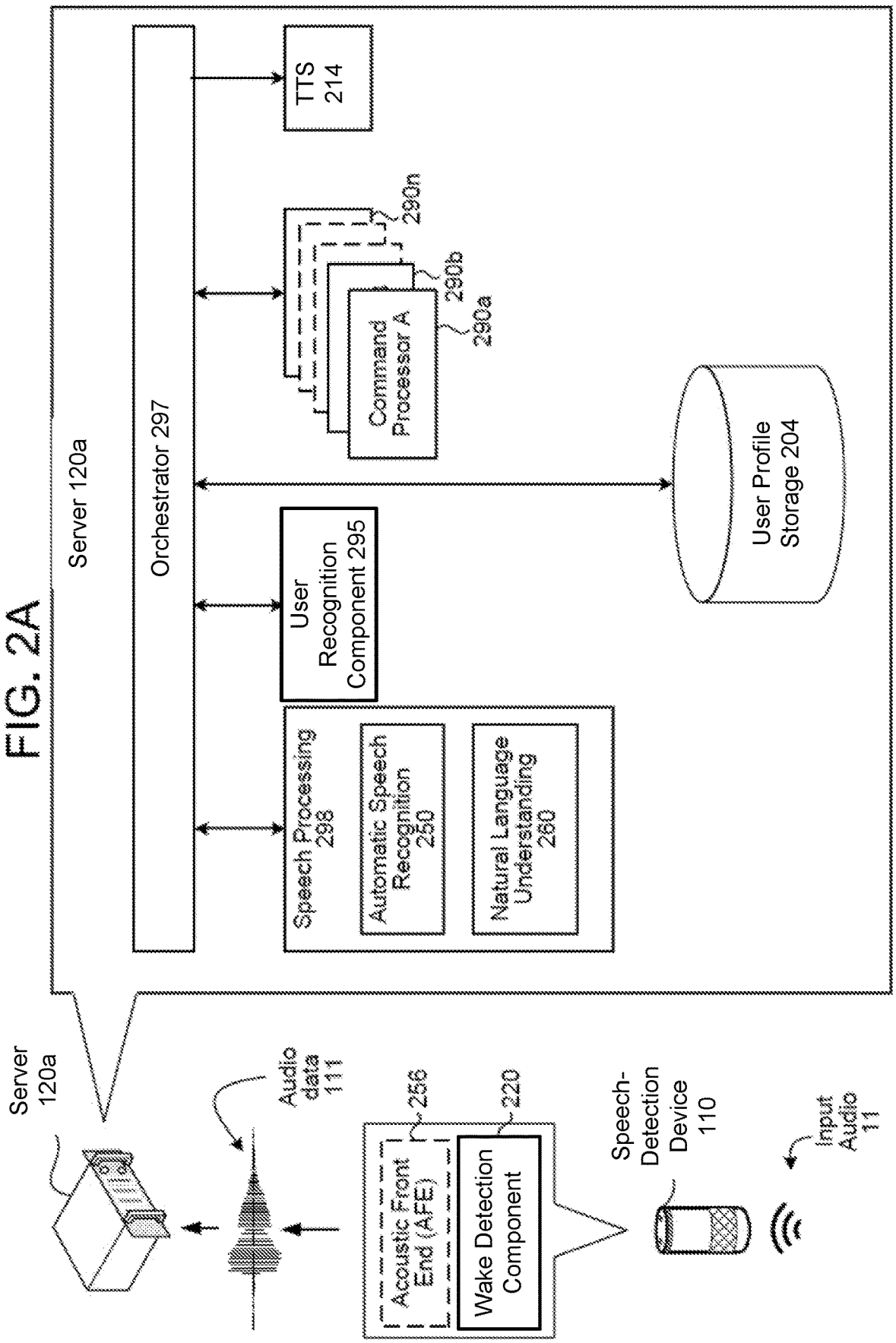

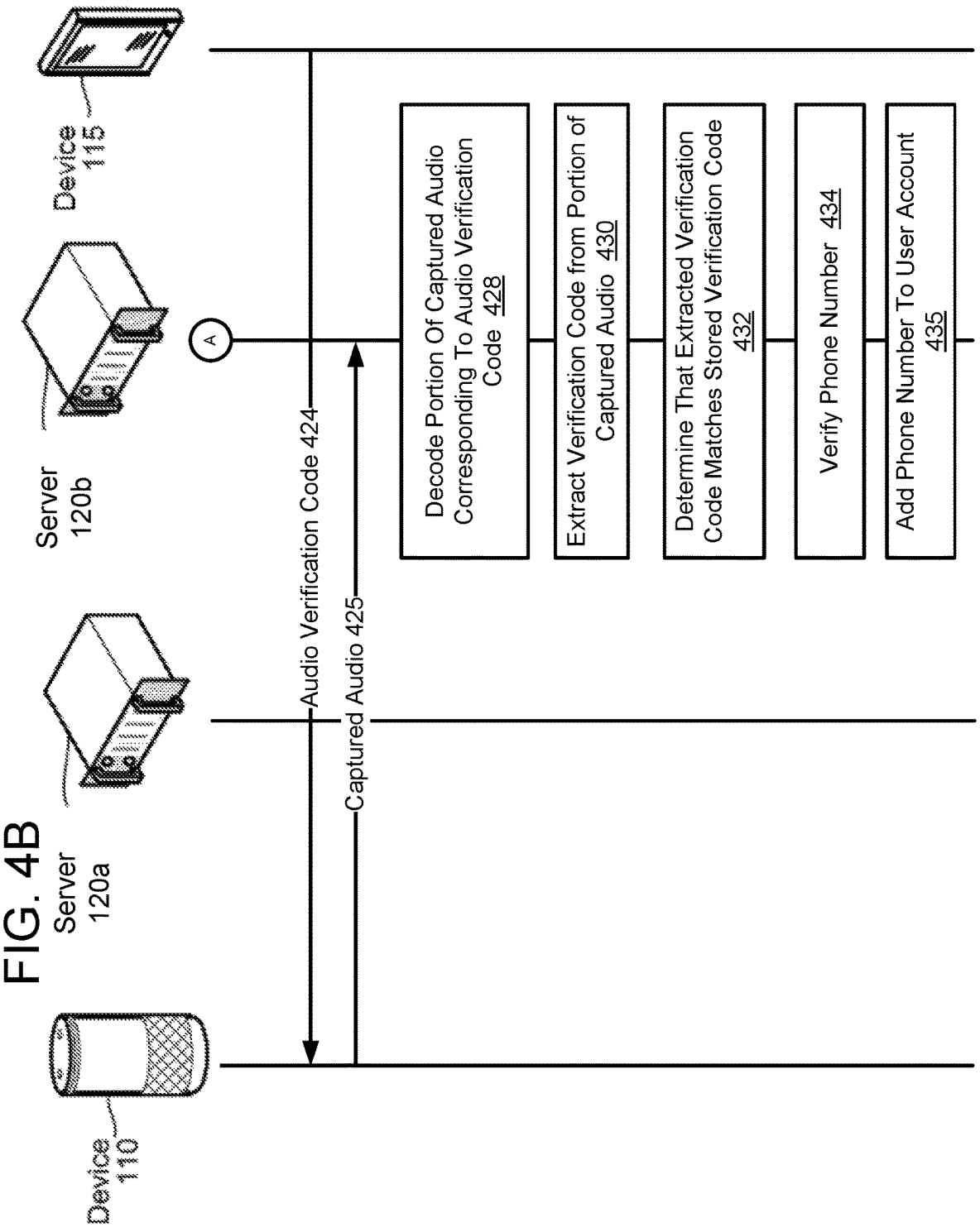

US 10,887,764 B1

AUDIO VERIFICATION

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items and to perform other operations such as telephony operations. In order to access content and/or use some functions of such an electronic device, the electronic device is generally registered to a user account, and contact data is associated with the user account.

BRIEF DESCRIPTION OF DRAWINGS

For a more complete understanding of the present disclosure, reference is now made to the following description taken in conjunction with the accompanying drawings.

FIG. 1A illustrates a system configured to verify operations using audio data according to embodiments of the present disclosure.

FIG. 2A is a diagram of components of a speech processing system according to embodiments of the present disclosure.

FIGS. 4A-4B are sequence diagrams illustrating the verification of a phone number using an audio verification code according to embodiments of the present disclosure.

DETAILED DESCRIPTION

Figure 1B:
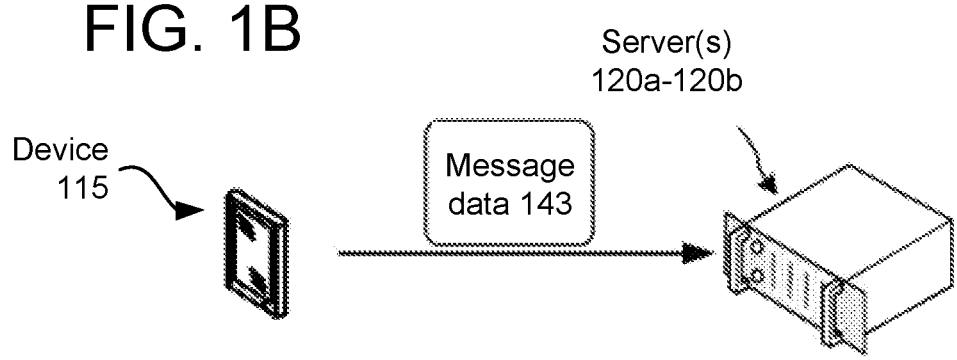
FIGS. 1B through 1E are signal flow diagrams illustrating the transmission of messages according to embodiments of the present disclosure.

Embodiments described herein are directed to verification of operations using audio data. In embodiments, verification may be performed to confirm that an entity that initiated an operation has authorization to complete the operation. Examples include verification that a phone number is controlled by a user associated with a user account, verification of a purchase transaction, verification that a requestor has access to information, verification that a requestor has access to enter a location, verification that contact data is to be added to a user account, and so on. For example, embodiments may verify that a correct phone number is linked to a user account (e.g., that the user requesting to link the phone number to their user account actually owns or controls the phone number). Embodiments take advantage of the capabilities of a speech-detection device to facilitate verification of an operation with minimal user input, improving a user experience for operations such as verification of phone numbers for user accounts.

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications. Speech processing may be used by computers, hand-held devices, telephone computer systems, kiosks, and a wide variety of other devices to improve human-computer interactions.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. ASR, NLU may be used together as part of a speech processing system.

A user may request verification of a phone number (e.g., request that a phone number be added to a user account) via an application executing on a first device. The application may be, for example, a speech-detection application. Each instance of the application may have a unique application identifier (ID). The first device may be a mobile phone associated with a phone number. Responsive to the request, the application may generate a text message (e.g., an SMS message) and send the text message to a server. The server may then generate a verification code, encode the verification code into audio data, and send a response message to the phone number associated with the first device.

The user may speak an utterance (e.g., a command) to a second device that is part of a speech processing system configured to execute one or more commands corresponding to input speech. For example, the second device may capture audio corresponding to "device, verify phone number," "device, verify transaction," or the like. The utterance may include an activation code that places the second device into a listening mode, in which it captures audio and sends the captured audio to the speech processing system. The speech processing system may process the utterance to determine that a verification operation has been requested.

The user may cause the first device to play the audio data, which may be captured by the second device. The speech processing system may process the captured audio to extract the audio verification code from the audio data in the captured audio. The captured audio may be an audio recording or an audio stream, for example. A result of the extraction is a text-based version of the verification code. The speech processing system may then verify that the phone number should be added to the user account of the user. Similar techniques may also be used to verify other operations, information, transactions, and so on.

The present disclosure provides new techniques for verifying phone numbers, transactions, other operations, and information using audio data. These techniques reduce the amount of information that a user is expected to manually input, and may reduce user input to a press of one or a few buttons while maintaining maximum security.

FIG. 1A shows a system 100 configured to verify operations and/or contact data using audio data. Although the figures and discussion illustrate certain operations of the system 100 in a particular order, the operations described may be performed in a different order (as well as certain operations removed or added) without departing from the intent of the disclosure. As shown in FIG. 1A, a first device 110 local to a user 5, servers 120*a-b*, a communication router device 125, and a second device 115 local to the user 5 may be in communication over one or more networks 199. The servers 120*a-b* (which may be one or more different physical devices) may be capable of performing traditional speech processing (e.g., ASR, NLU, command processing, etc.) as well as other operations as described herein. A single server 120*a* may perform all speech processing or multiple servers 120*a-b* may combine to perform all speech processing. Further, the servers 120*a-b* may execute certain commands, such as answering spoken utterances of users 5, sending messages of users 5, and operating other devices (e.g., light switches, appliances, etc.). In one embodiment, servers 120*a-b* include a first server 120*a* or set of servers that perform speech processing and a second server 120*b* or set of servers that include a communications system. Alternatively, a single server may include both a speech processing system and a communications system. In addition, certain speech-detection or command execution functions may be performed by the first device 110, which may be a speech-detection device.

As shown in FIG. 1A, server(s) 120*b* (or server 120*a*) may receive message data from a particular phone number (block 142). The message data may be received in the form of a text message (e.g., an SMS message or a multimedia messaging system (MMS) message) generated by device 115 and sent to a phone number associated with server 120*b*. An application running on the device 115 may generate the message data and use an application programming interface (API) of the device 115 to send the message data using a messaging protocol enabled on the device 115. The application, which may be for example a speech-detection application, may generate message content and then send a request or instruction to a messaging application on the device 115 (e.g., using an API for the messaging application) to generate and send a message to a particular destination (e.g., to a phone number used by server 120*b*) to trigger phone number verification operations.

The message data may be sent to communication router devices 125. The communication router devices 125 may include one or more systems of a cellular service provider. Such systems may include, for example, a messaging system controlled by a cellular phone service provider, such as a short message service (SMS) system or a multimedia messaging service (MMS) system. Other examples of protocols that may be used to send and receive the message data include hypertext transport protocol (HTTP), hypertext transport protocol secure (HTTPS), simple object access protocol (SOAP), and so on. The message data may include a header and a payload, which may vary based on the messaging protocol used. The message data may be synchronous message data or asynchronous message data. For example, the message data may be in the form of a phone call or video call to a phone number associated with server 120*b*. The messaging system may send the message data on to server 120*b*. FIG. 1B illustrates transmission of message data from the device 115 to the server(s) 120*a-b* (block 143). The message data may be message data that was manually typed by a user (e.g., using an SMS or MMS application on device 115). Alternatively, an application on the device 115 (e.g., a speech-detection application) may generate text and auto populate a message, along with a recipient address or phone number. The user may then be asked to press the send button to send the message data. Alternatively, the device 115 may automatically send the message data.

Receipt of the message data by the server 120*b* may trigger a verification service and/or verification domain on the server 120*b*. Responsive to receiving the message data, the server 120*b* may generate a verification code (block 144). The verification code may be a random number generated using, for example, a random number generator or pseudo-random number generator. As used herein, the term random number includes both completely random numbers and pseudorandom numbers. In one embodiment, a hash is performed on the random number to generate the verification code. The verification code may have any number of digits, some examples being 6 digits, 10 digits, 15 digits, 32 digits, 64 digits, and so on. A greater number of digits increases the security of the verification code. A non-audio or text (e.g., binary, numeric or alphanumeric) representation of the verification code may then be stored (also referred to as a non-audio instance of the verification code and non-audio data representing the verification code).

The server 120*b* may then generate audio data representing the verification code (block 146). This may include generating a new audio file and/or encoding audio information representing the verification code into an existing audio file. The verification code may be encoded into an audio format using one or more audio modulation schemes such as frequency shift keying, phase shift keying, pulse modulation, and so on. The verification code may also be encoded into an audio format using text to speech. For example, an audio code of 123 could be encoded into an audio file of a voice sayings "1 2 3". One or both of the server(s) 120*a-b* may include an encoder that encodes the verification code into the audio data (e.g., that generates the audio data representing the verification code) and/or a decoder that will later decode the verification code from the audio data (e.g., that generates a text version of the verification code from the audio data).

Once the audio data is generated, the server 120*b* may generate message data (e.g., a response message) comprising the audio data (e.g., audio verification data) or a link to the audio data, and sends the message data to the phone number from which the initial message data was received.

Figure 1C:
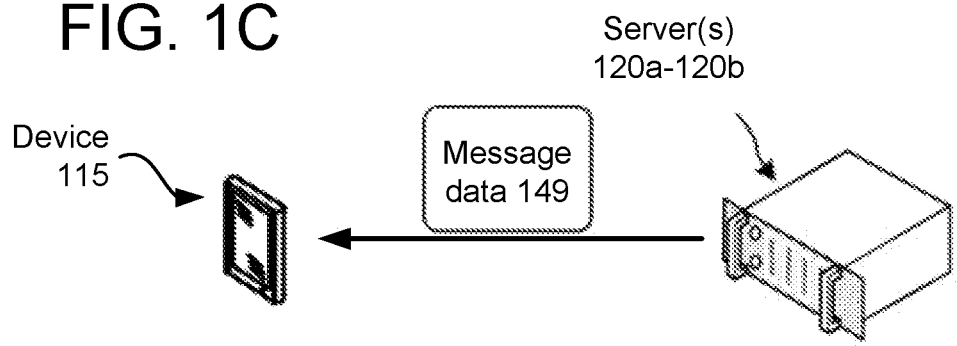

The communication router devices 125 may then send the message data to the device associated with the phone number, which is the device 115 that generated the initial text message. The message data may be included in a text message (e.g., an SMS or MMS message) that includes the audio data or a link to the audio data. Other examples of protocols that may be used to send and receive the message data include hypertext transport protocol (HTTP), hypertext transport protocol secure (HTTPS), simple object access protocol (SOAP), and so on. The message data may include a header and a payload, which may vary based on the messaging protocol used. FIG. 1C illustrates transmission of the message data from the server(s) 120a-b to the device 115 (block 149).

A device 110 may be a speech-detection device that captures audio 11 including a spoken utterance of a user 5 via a microphone or microphone array of the device 110. The audio 11 may include a voice activation command for the device 110, which may place the device 110 into a listening mode. While in the listening mode, the device 110 activates one or more microphones and sends captured audio to one or more servers 120a-b. The device 110 determines audio data corresponding to the captured audio 11, and sends the audio data to the server(s) 120a-b for processing.

Figure 1D:
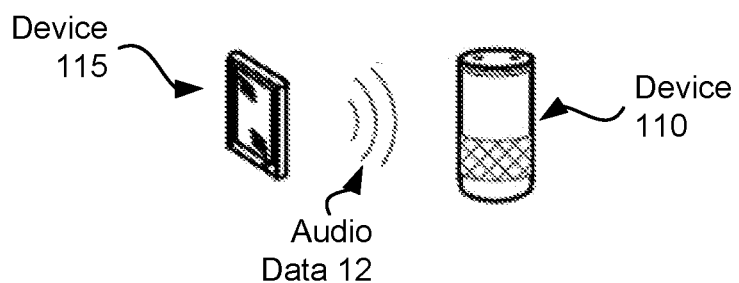
Figure 1E:
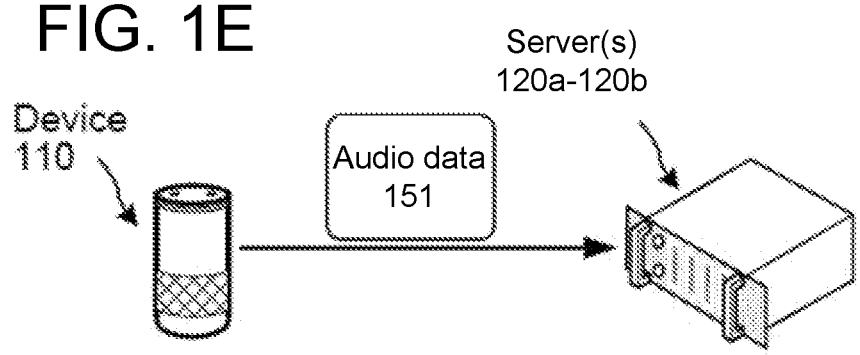

While the device 110 is in the listening mode, the device 115 plays the audio data 12 that was included in the response message (e.g., included as a file or a hyperlink in the response message). The device 110 captures the audio data 12 and sends second audio data including the captured audio data 12 to the server(s) 120a-b. The server(s) 120a-b receives (150) the second audio data from the device 110. The server(s) 120a-b may receive the captured audio in the form of an audio recording or an audio stream, which may include the audio data 12 as well as background noise, additional utterances of the user 5, and/or other sounds. FIG. 1D illustrates device 115 playing the audio data 12 to device 110. FIG. 1E illustrates device 110 sending the second audio data (captured audio including the audio data 12 and possibly other sounds) to the server(s) 120a-b (block 151).

In addition to the audio 11 containing a command that places the device 110 into listening mode, the audio 11 may additionally include a further command to perform a verification operation. For example, the audio 11 may contain the phrase, "Device X, verify." The utterance "device X" may place the device 110 into listening mode, while the phrase "verify" may be a command that will initiate a verification operation at one or more of the servers 120a-b.

The server 120a may determine, based on speech processing (e.g., ASR and NLU) of the audio data, that the utterance corresponds to a command to verify a phone number (or verify another operation or other information). The server 120a or server 120b extracts the verification code from the second audio data (captured audio) (block 152). This may include storing the captured audio, and processing the captured audio using a decoder. The decoder may convert the audio data into non-audio data (e.g., text/numerical data) comprising the verification code. The server 120b may then verify that the device 115 is associated with the phone number to which the server 120b sent the message data (response message) (block 154). Verification may be performed by comparing a stored version of the verification code to the version of the verification code that was decoded from the second audio data. If the two verification codes have the same value, then the phone number may be confirmed. The server 120b may therefore verify the phone number for a user account associated with the device, which may include adding the phone number to the user account.

At this point, an application on the device 115 is able to use the phone number for one or more actions, such as to make or receive phone calls using a voice over internet protocol (VOIP) service.

Figure 2B:
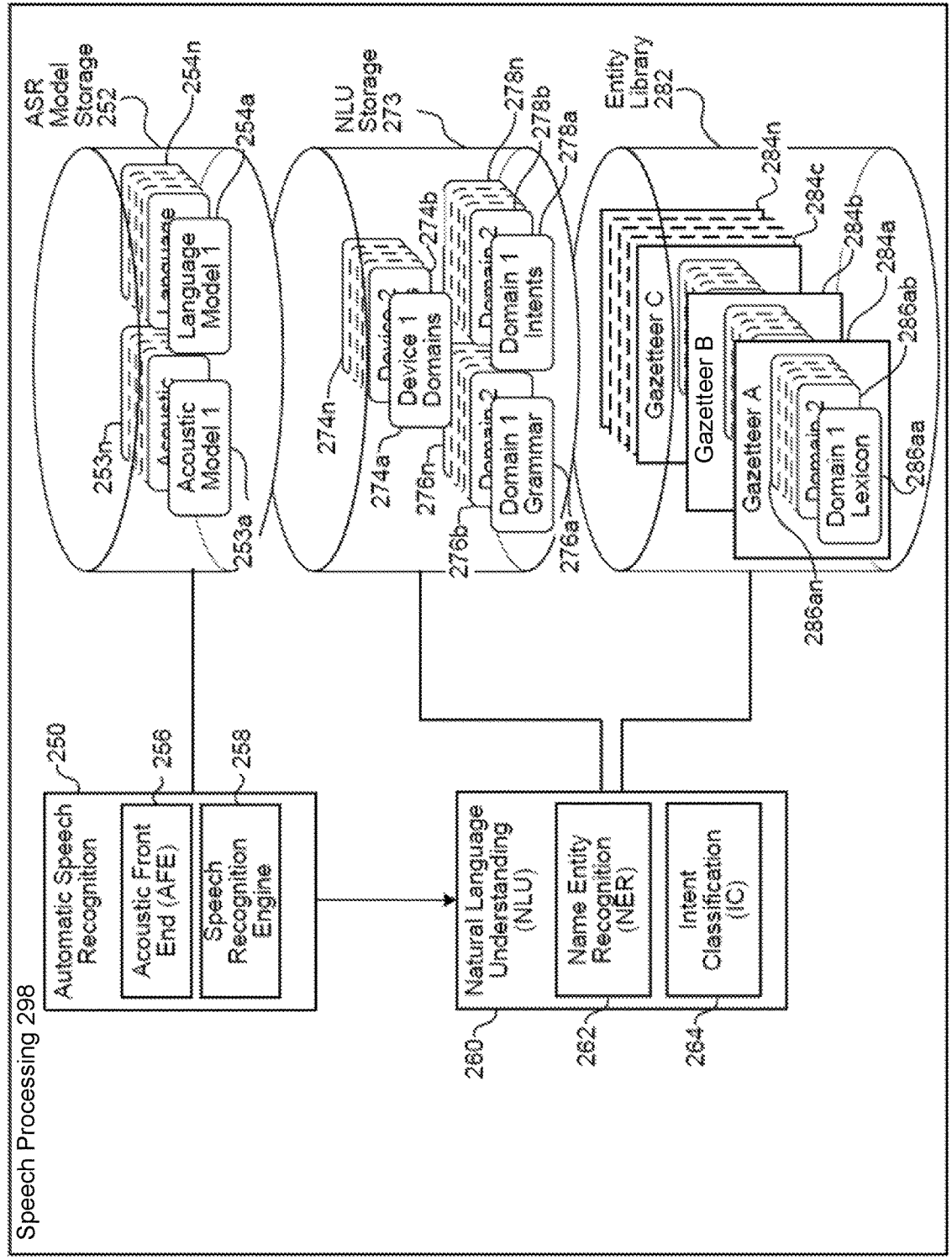
FIG. 2B is a diagram of components of a speech processing system according to embodiments of the present disclosure.
Figure 2C:
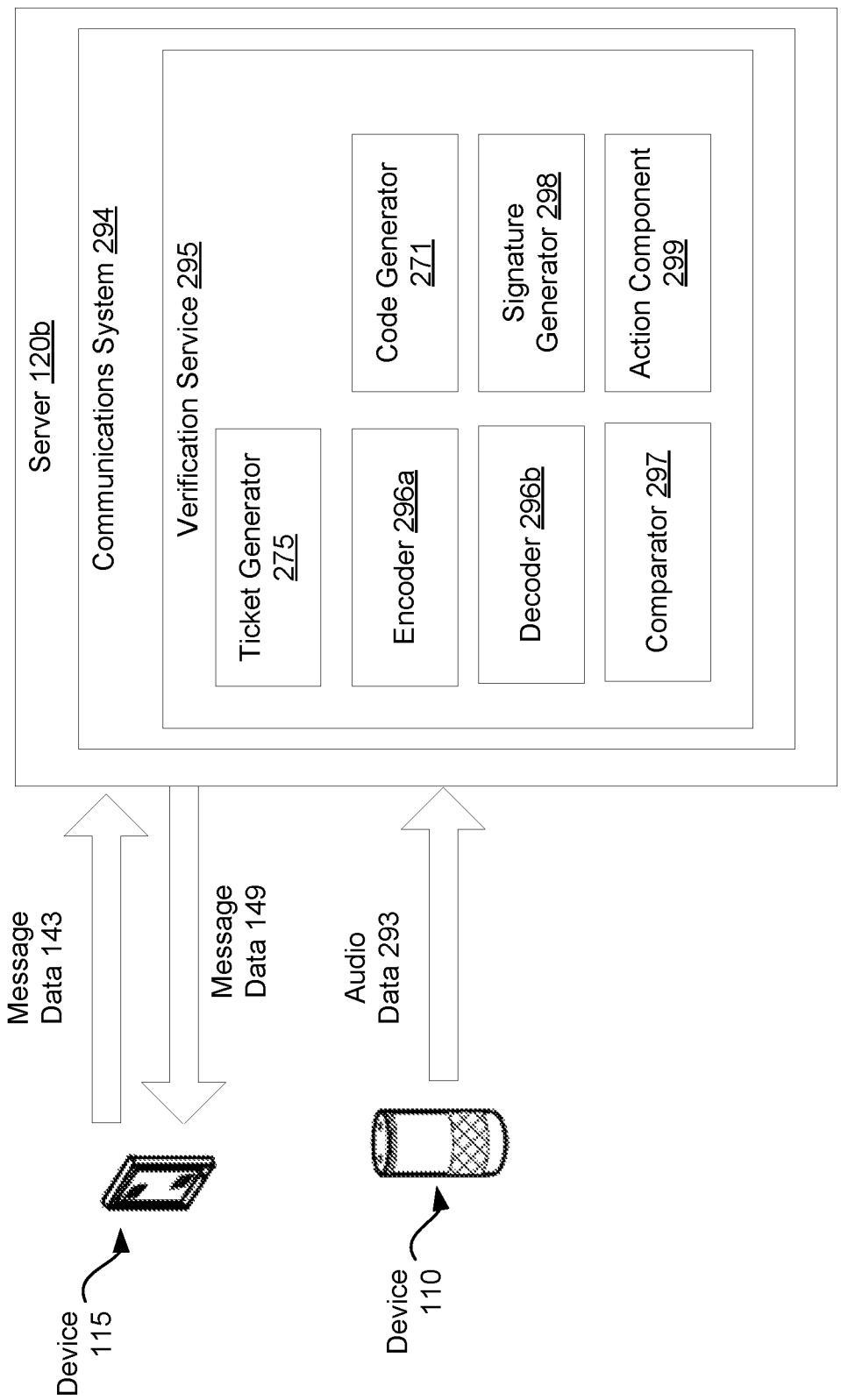
FIG. 2C is a logical block diagram of a communications system, in accordance with embodiments of the present disclosure.

The system 100 of FIGS. 1A-1E may operate using various speech processing components as described in FIGS. 2A and 2B as well as a communications system as described in FIG. 2C. The various components illustrated may be located on a same or different physical devices. Communication between various components illustrated in FIGS. 2A-C may occur directly or across a network(s) 199. An audio capture component, such as a microphone (or array of microphones) of the speech-detection device 110 (or other device), captures input audio 11 corresponding to a spoken utterance. The speech-detection device 110, using a wakeword detection component 220, processes audio data corresponding to the input audio 11 to determine if a keyword (such as a wakeword) is detected in the audio data. Following detection of a wakeword, the speech-detection device 110 sends audio data 111, corresponding to the utterance, to a server(s) 120a-b for processing. The audio data 111 may be output from an acoustic front end (AFE) 256 located on the speech-detection device 110 prior to transmission, or the audio data 111 may be in a different form for processing by a remote AFE 256, such as the AFE 256 located with an ASR component 250 of the server(s) 120.

The wakeword detection component 220 works in conjunction with other components of the speech-detection device 110, for example a microphone to detect keywords in audio data corresponding to the input audio 11. For example, the speech-detection device 110 may convert input audio 11 into audio data, and process the audio data with the wakeword detection component 220 to determine whether speech is detected, and if so, if the audio data comprising speech matches an audio signature and/or model corresponding to a particular keyword, (e.g., "verify").

The speech-detection device 110 may use various techniques to determine whether audio data includes speech. Some embodiments may apply voice activity detection (VAD) techniques. Such techniques may determine whether speech is present in audio data based on various quantitative aspects of the audio data, such as a spectral slope between one or more frames of the audio data; energy levels of the audio data in one or more spectral bands; signal-to-noise ratios of the audio data in one or more spectral bands; or other quantitative aspects. In other embodiments, the speech-detection device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio data to one or more acoustic models in speech storage, which acoustic models may include models corresponding to speech, noise (such as environmental noise or background noise), or silence. Still other techniques may be used to determine whether speech is present in audio data.

Once speech is detected in the audio data, the speech-detection device 110 may use the wakeword detection component 220 to perform wakeword detection to determine when a user intends to speak a command to the speech-detection device 110. This process may also be referred to as keyword detection, with the wakeword being a specific example of a keyword. Specifically, keyword detection is typically performed without performing linguistic analysis, textual analysis, or semantic analysis. Instead, audio data is analyzed to determine if specific characteristics of the audio data match preconfigured acoustic waveforms, audio signatures, or other data to determine if the incoming audio data "matches" stored audio data corresponding to a keyword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching conducted in resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in a decoding graph, and the decoding output is further processed to make the decision on keyword presence. This approach can be extended to include discriminative information by incorporating a hybrid deep neural network (DNN)-HMM decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected in the audio data, the speech-detection device 110 may "wake" and begin transmitting audio data 111 corresponding to input audio 11 to server 120*a* for speech processing (e.g., for purposes of executing a command in the speech). The audio data 111 may include data corresponding to the wakeword, or the portion of the audio data corresponding to the wakeword may be removed by the speech-detection device 110 prior to sending the audio data 111 to the server 120*a*. The audio data may additionally include a voice command associated with verification of an operation, verification of contact data and/or an audio verification code.

Upon receipt by the server 120*a*, an orchestrator component 297 sends the audio data 111 to a speech processing component 298, and namely an ASR component 250 of the speech processing component 298. The ASR component 250 transcribes the audio data 111 into text data representing words of speech contained in the audio data 111. The text data may then be used by other components for various purposes, such as executing system commands, inputting data, etc. A spoken utterance in the audio data 111 is input to a processor configured to perform ASR, which then interprets the spoken utterance based on a similarity between the spoken utterance and pre-established language models 254 stored in an ASR model knowledge base (i.e., an ASR model storage 252). For example, the ASR component 250 may compare the audio data 111 with models for sounds (e.g., subword units or phonemes) and sequences of sounds to identify words that match the sequence of sounds spoken in the utterance of the audio data 111.

The different ways a spoken utterance may be interpreted (i.e., the different hypotheses) may each be assigned a respective probability/confidence score representing a likelihood that a particular set of words matches those spoken in the utterance. The confidence score may be based on a number of factors including, for example, a similarity of the sound in the spoken utterance to models for language sounds (e.g., an acoustic model 253 stored in the ASR model storage 252), and a likelihood that a particular word that matches the sound would be included in the sentence at the specific location (e.g., using a language model 254 stored in the ASR model storage 252). Thus, each potential textual interpretation of the spoken utterance (i.e., hypothesis) is associated with a confidence score. Based on the considered factors and the assigned confidence score, the ASR component 250 outputs the most likely text data corresponding to the audio data 111. The ASR component 250 may also output multiple hypotheses in the form of a lattice or an N-best list with each hypothesis corresponding to a confidence score or other score (e.g., such as probability scores, etc.).

The server 120*a* including the ASR component 250 may include an AFE 256 and a speech recognition engine 258. The AFE 256 transforms audio data 111 into data for processing by the speech recognition engine 258. The speech recognition engine 258 compares the speech recognition data with acoustic models 253, language models 254, and other data models and information for recognizing the speech conveyed in the audio data 111. The AFE 256 may reduce noise in the audio data 111 and divide the digitized audio data 111 into frames representing time intervals for which the AFE 256 determines a number of values (i.e., features) representing qualities of the audio data 111, along with a set of those values (i.e., a feature vector or audio feature vector) representing features/qualities of the audio data 111 within each frame. In one configuration, each audio frame includes 25 ms of audio data and the frames start at 10 ms intervals resulting in a sliding window where adjacent audio frames include 15 ms of overlapping audio data. Many different features may be determined, as known in the art, and each feature represents some quality of the audio data 111 that may be useful for ASR processing. A number of approaches may be used by the AFE 256 to process the audio data 111, such as mel-frequency cepstral coefficients (MFCCs), perceptual linear predictive (PLP) techniques, neural network feature vector techniques, linear discriminant analysis, semi-tied covariance matrices, or other approaches known to those skilled in the art.

The speech recognition engine 258 may process data output from the AFE 256 with reference to information stored in the ASR model storage 252. Alternatively, post-AFE processed data (e.g., feature vectors) may be received by the device executing ASR processing from another source besides the internal AFE 256. For example, the speech-detection device 110 may process audio data 111 into feature vectors (e.g., using an on-device AFE 256) and transmit the feature vector data to the server 120*a*, across the network(s) 199, for ASR processing. Feature vector data may arrive at the server 120*a* encoded, in which case it may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR component 250 will output text data representing speech that makes sense grammatically.

The speech recognition engine 258 may use a number of techniques to match feature vectors to phonemes, for example using HMMs to determine probabilities that feature vectors may match phonemes. Sounds received may be represented as paths between states of the HMM and multiple paths may represent multiple possible text matches for the same sound.

Following ASR processing, the ASR results (i.e., text data representing speech) may be sent by the speech recognition engine 258 to the orchestrator 297 or other processing components, which may be local to the device performing ASR and/or distributed across the network(s) 199. For example, ASR results in the form of a single textual representation of the speech, an N-best list including multiple hypotheses and respective scores, lattice, etc. may be sent from the ASR component 250 to an NLU component 260 either directly or indirectly through the orchestrator component 297.

The device performing NLU processing (e.g., the server 120a) may include various components, including potentially dedicated processor(s), memory, storage, etc. The device performing NLU processing may include a dedicated NLU component 260, which may include a named entity recognition (NER) component 262 and an intent classification (IC) component 264. The device performing NLU processing may additionally include NLU storage 273, and a knowledge base (not illustrated). The knowledge base is a database or other information storage that may include information about entities that may be used in resolving spoken utterances. The NLU component 260 may also utilize gazetteer information 284 stored in an entity library storage 282. The knowledge base and/or gazetteer information 284 may be used for entity resolution, for example matching ASR results with different entities (e.g., song titles, contact names, etc.). Gazetteers 284 may be linked to users (e.g., a particular gazetteer may be associated with a specific user's music collection), may be linked to certain domains (e.g., shopping), or may be organized in a variety of other ways. Domain, as used herein, may refer to a category of content, such as music, videos, weather, etc.

The NLU component 260 takes text data (e.g., output from the ASR component 250) and attempts to make a semantic interpretation of the text data. That is, the NLU component 260 determines the meaning behind the text data based on the individual words and then implements that meaning. The NLU component 260 interprets a text string to derive an intent or a desired action from the user as well as the pertinent pieces of information in the text data that allow a device (e.g., the speech-detection device 110, the server 120a, server communication router 125, etc.) to complete that action. For example, if a spoken utterance is processed using the ASR component 250, which outputs the text data "call mom", the NLU component 260 may determine the user intended to activate a telephone in his/her device and to initiate a call with a contact matching the entity "mom."

The NLU component 260 may process several textual inputs related to the same utterance. For example, if the ASR component 250 outputs N text segments (e.g., as part of an N-best list), the NLU component 260 may process all N outputs to obtain NLU results.

The NLU component 260 may be configured to parse and tag to annotate text data as part of NLU processing. For example, for the text data "verify phone number," the NLU component 260 may tag "verify" as a command (e.g., to execute verification of a phone number) and may tag "phone number" as a specific entity and target of the command.

To correctly perform NLU processing of an utterance, the NLU component 260 may be configured to determine a "domain" of the utterance so as to determine and narrow down which services offered by an endpoint device (e.g., the server(s) 120, the speech-detection device 110, a communication router 125, etc.) may be relevant. For example, an endpoint device may offer services relating to interactions with a telephone service, a contact list service, a calendar/scheduling service, a music player service, a verification service, etc. Words in text data may implicate more than one service, and some services may be functionally linked (e.g., both a telephone service and a calendar service may utilize data from the contact list).

The NER component 262 receives an utterance in the form of ASR results and attempts to identify relevant grammars and lexical information that may be used to construe meaning. To do so, the NER component 262 may begin by identifying potential domains that may relate to the received utterance. The NLU storage 273 includes a database of domains 274 associated with specific devices. For example, the speech-detection device 110 may be associated with domains for music, telephony, calendaring, contact lists, verifications, and device-specific communications. In addition, the entity library 282 may include database entries about specific services on a specific device, either indexed by Device ID, User ID, Household ID, or some other indicator.

A domain may represent a discrete set of activities having a common theme, such as "shopping", "music", "calendaring", "verification," etc. As such, each domain may be associated with a particular language model and/or grammar database 276, a particular set of intents/actions 278, and/or a particular personalized lexicon 286. Each gazetteer 284 may include domain-indexed lexical information associated with a particular user and/or device. For example, the Gazetteer A 284a includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

An utterance may be processed applying the rules, models, and information applicable to each identified domain. For example, if an utterance potentially implicates both communications and music, the utterance may be NLU processed using the grammar models and lexical information for communications, and may also be processed using the grammar models and lexical information for music. The responses to the spoken utterance produced by each set of models is scored, with the overall highest ranked result from all applied domains being ordinarily selected to be the correct result.

The IC component 264 parses the utterance to determine an intent(s) for each identified domain, where the intent(s) corresponds to the action to be performed that is responsive to the spoken utterance. Each domain is associated with a database 278 of words linked to intents. For example, a music intent database may link words and phrases such as "quiet," "volume off," and "mute" to a "mute" intent. A verification database may link words and phrases such as "verify operation", "verify transaction", "verify phone number", "pair device", "pair phone number", "verify", and so on. The IC component 264 identifies potential intents for each identified domain by comparing words in the utterance to the words and phrases in the intents database 278.

In order to generate a particular interpreted response, the NER component 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user and/or the device. For instance, a grammar model 276 associated with a verification domain may include a database of words commonly used when people request verification or confirmation of data, transactions, or operations.

The intents identified by the IC component 264 are linked to domain-specific grammar frameworks (included in 276) with "slots" or "fields" to be filled. For example, if "verify phone number" is an identified intent, a grammar framework(s) may correspond to sentence structures such as "Verify {operation}," "Verify {data}," "Verify {transaction}," "Verify {phone number}," etc. However, to make recognition more flexible, these frameworks would ordinarily not be structured as sentences, but rather based on associating slots with grammatical tags.

For example, the NER component 262 may parse the spoken utterance to identify words as subject, object, verb, preposition, etc., based on grammar rules and models, prior to recognizing named entities. The identified verb may be used by the IC component 264 to identify intent, which is then used by the NER component 262 to identify frameworks. A framework for an intent of "verify" may specify a list of slots/fields applicable to verify the identified "object" and any object modifier (e.g., a prepositional phrase), such as {my}, {user name}, {first}, etc. The NER component 262 then searches the corresponding fields in the domain-specific and personalized lexicon(s), attempting to match words and phrases in the utterance tagged as a grammatical object or object modifier with those identified in the database(s).

This process includes semantic tagging, which is the labeling of a word or combination of words according to their type/semantic meaning. Parsing may be performed using heuristic grammar rules, or the NER component 262 may be constructed using techniques such as HMMs, maximum entropy models, log linear models, conditional random fields (CRF), and the like.

For instance, an utterance of "verify phone number" might be parsed and tagged as {Verb}: "Verify," {Object}: "phone number." At this point in the process, "Verify" is identified as a verb based on a word database associated with the verification domain, which the IC component 264 will determine corresponds to the "verify phone number" intent.

The frameworks linked to the intent are then used to determine what database fields should be searched to determine the meaning of these phrases, such as searching a user's gazetteer for similarity with the framework slots. So a framework for a "Verify" intent might indicate to attempt to resolve the identified object based on {object name}, {transaction label}, and/or {operation identifier}. If the search of the gazetteer does not resolve the slot/field using gazetteer information, the NER component 262 may search the database of generic words associated with the domain (i.e., in the NLU storage 273). For instance, if the utterance was "play songs by the rolling stones," after failing to determine an album name or song name called "songs" by "the rolling stones," the NER component 262 may search the domain vocabulary for the word "songs." In the alternative, generic words may be checked before the gazetteer information, or both may be tried, potentially producing two different results.

The comparison process used by the NER component 262 may classify (i.e., score) how closely a database entry compares to a tagged word or phrase, how closely the grammatical structure of the utterance corresponds to the applied grammatical framework, and based on whether the database indicates a relationship between an entry and information identified to fill other slots of the framework.

The NER component 262 may also use contextual operational rules to fill slots. For example, if a user previously sent message data that triggered a verification code to be generated, the NER component 262 may apply an inference-based rule to fill a slot associated with the verification code that was generated.

The results of NLU processing may be tagged to attribute meaning to the utterance. For example, "Verify phone number" might produce a result of: {domain} Verification, {intent} Verify, {object to verify} "phone number."

The output from the ASR component 250 may also be sent to a user recognition component 295 either directly or indirectly through the orchestrator component 297. Alternatively, the user recognition component 295 may be implemented as part of the ASR component 250. The user recognition component 295 performs user recognition using the audio data 111, and optionally the ASR component output. The user recognition component 295 may include a scoring component that determines respective scores indicating whether the input utterance in the audio data 111 was spoken by particular users. The user recognition component 2 may also include a confidence component that determines an overall confidence as the accuracy of user recognition operations. User recognition may involve comparing speech characteristics in the audio data 111 to stored speech characteristics of users. User recognition may also involve comparing biometric data (e.g., fingerprint data, iris data, etc.) received by the user recognition component 295 to stored biometric data of users. User recognition may further involve comparing image data including a representation of a feature of a user with stored image data including representations of features of users. It should be appreciated that other kinds of user recognition processes, including those known in the art, may be used.

Output from the NLU processing, which may include tagged text data, commands, etc., and output of the user recognition component 295 (e.g., a unique ID of a user) may be sent to a command processor 290, which may be located on a same or separate server 120*a-b* as part of the system 100. The system 100 may include more than one command processor 290, and the command processor(s) 290 may be determined based on the NLU output. For example, if the NLU output includes a command to play music, the command processor 290 selected may correspond to a music playing application, such as one located on the speech-detection device 110 or in a music playing appliance. In another example, if the NLU output includes a command to verify an operation, the command processor 290 selected may correspond to a verification domain or verification service. Many such command processors 290 may be available to the system 100 depending on the various applications that may be invoked. In one embodiment, a command processor 290*a* may be associated with a verification service and/or communication system that may be located on a different server (e.g., server 120*b*). The command processor 290*a* may be an interface for sending data to the verification service and/or communication system located on the different server. The communication system is described in greater detail below with reference to FIG. 2C.

Output from the NLU component 260 (and optionally the user recognition component 295) may be sent to a command processor(s) 290/skill either directly or indirectly via the orchestrator component 297. A "skill" may correspond to a domain and may be software running on a server or device akin to an application. That is, a skill may enable a server to execute specific functionality in order to provide data or produce some other output called for by a user. The system may be configured with more than one skill. For example a weather service skill may enable a server to execute a command with respect to a weather service server, a car service skill may enable a server to execute a command with respect to a taxi service server, an order pizza skill may enable a server to execute a command with respect to a restaurant server, a verification skill may enable a server to execute a command with respect to a verification service, etc.

The server 120a may include multiple command processor(s) 290a, 290b through 290n. These command processors 290a-n may include, for example, a communication manager command processor 290a and a verification command processor 290b. The communication manager command processor 290a may be configured to perform various operations described herein with respect to message generation and transmission, or may be configured to interface with a communications system. The verification command processor 290b may be configured to perform various operations described herein with respect to verification of an operation such as a purchase transaction or linking of a phone number to a user account, or may be configured to interface with a verification system. A verification skill or system may provide a verification service for maintaining open verification requests, comparing verification codes, decoding audio data to extract verification codes from the audio data, and notifying other skills, domains or command processors 290a-n when a verification is completed successfully.

A command processor 290a-n may output text that is to be spoken to a user via speech-detection device 110. Alternatively, a command processor 290a-n may receive text from, for example, a communication service, where the text is to be spoken to a user via speech-detection device 110. For example, a verification command processor may receive or output text stating, "please play the audio verification code." The command processor 290a-n provides the text to a text to speech (TTS) engine 214, which converts the text into speech (e.g., into an audio file that contains a spoken version of the content of the text). This audio file may be, for example, a Moving Picture Experts Group Audio Layer III (MP3) audio file or other type of compressed or uncompressed audio file. The audio file is sent to the speech-detection device 110 and then played by the speech-detection device 110. In one embodiment, a link to the audio file (e.g., a universal resource locator (URL)) is sent to the speech-detection device, and the speech-detection device 110 accesses the link to receive the audio file.

In addition to outputting text, for example, to "play audio verification code," the verification command processor may place the orchestrator into a state in which subsequent audio data received by server(s) 120a-b is sent directly to a particular command processor (e.g., to the verification command processor) or other component (e.g., to the communications system). In one embodiment, the verification command processor may transfer control of the speech-detection device 110 to the communications system. Audio data may then be sent directly to the communications system, bypassing server 120a until control is returned to server 120a.

After the speech-detection device 110 outputs audio stating, for example, "play audio verification code", a user device may play an audio verification code that was sent to the user device within a threshold proximity of the speech-detection device 110 (e.g., within a distance in which the speech-detection device 110 can pick up or detect the playing of the audio verification code). Audio data representing the played audio verification code may be received at server 120a and forwarded by orchestrator 297 directly to the appropriate command processor 290a-n or other component, bypassing the speech processing unit 298. The command processor 290a-n may include an audio decoder that processes the audio and decodes the audio into a non-audio (e.g., text or alphanumeric) representation of the verification code. The command processor 290a-n may then forward the non-audio representation of the verification code to the communications system, which may then compare the decoded verification code to one or more stored verification codes. If a value of the decoded verification code matches a value of a stored verification code, then an operation associated with the stored verification code may be verified and/or completed. In one embodiment, the command processor 290a-n forwards the received audio data containing the verification code to a verification service or communications service, which may perform these operations. In an alternative embodiment, the command processor 290a-n forwards the audio data to the communications system, and the communications system decodes the audio data. In another embodiment, server 120a is bypassed and speech-detection device 110 sends the audio data directly to the communications system.

FIG. 2C is a logical block diagram of a communications system 294, in accordance with an embodiment. Server 120b includes the communication system 294. The communications system 294 is a system that is configured to enable voice calls, voice messaging, text messaging and/or other communications between devices. The communications system 294 includes a verification service 295 that verifies operations for the communications system. For example, the verification service 295 may verify phone number pairing operations in which a phone number is added to an account of a user. The verification service 295 may also verify other contact data before that contact data is associated with a user account. Examples of contact data include a phone number, an email address, an internet protocol (IP) address, a physical address, an additional user account associated with a third party service (e.g., a user account of a social networking service), and so on. In alternative embodiments, the verification service 295 may be separate from the communications system 294, and may verify operations such as adding phone numbers to accounts as well as other operations such as purchase transactions. The verification service 295 may be included in server 120b or in a different server in embodiments.

Figure 5:
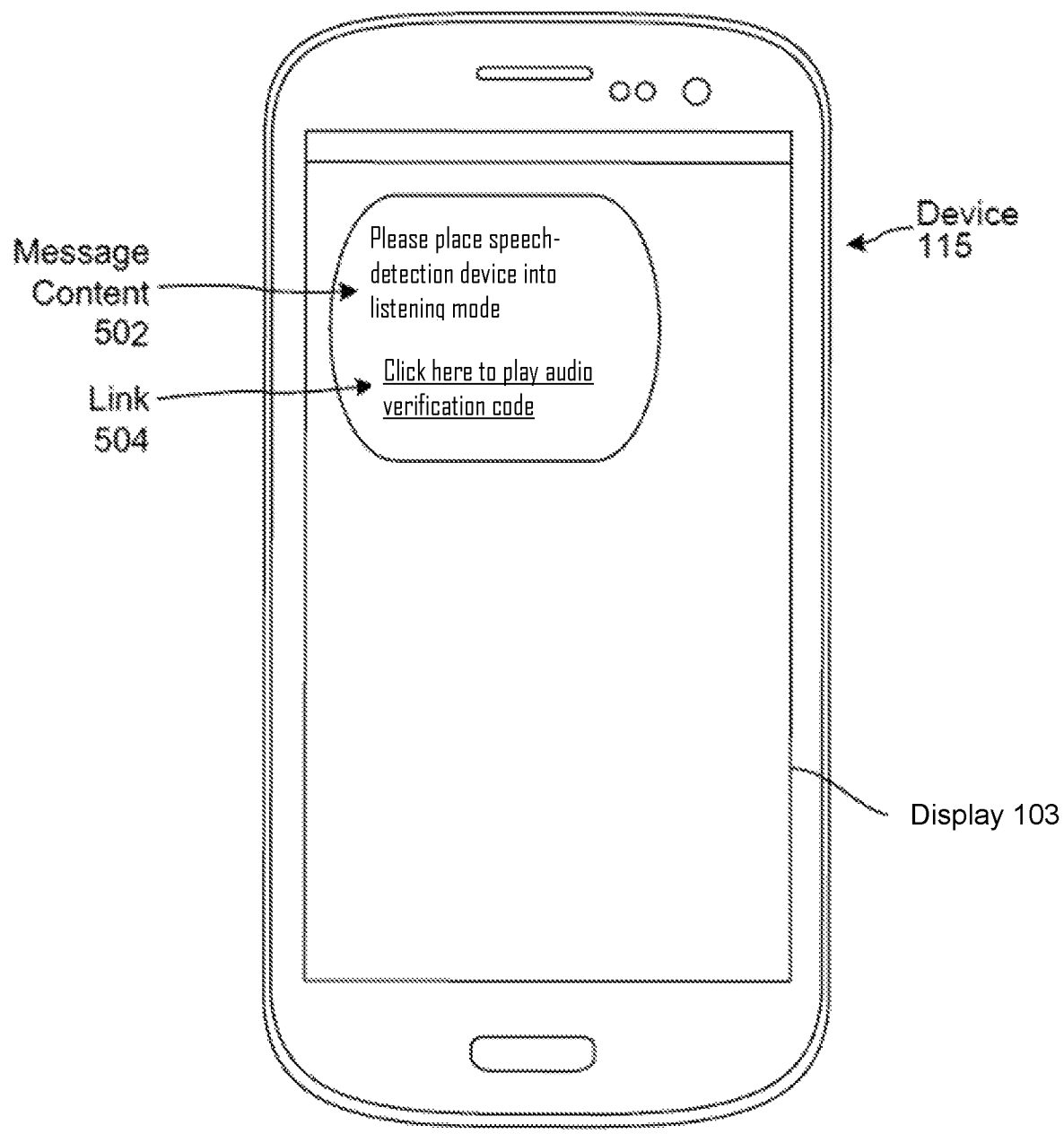
FIG. 5 illustrates an example of a message received by a mobile phone from a server according to embodiments of the present disclosure.

Server 120b may receive message data 143 from device 115. The message data 143 may include an indication of contact data to be associated with a user account, such as a phone number, IP address, email address, and so on. Responsive to receipt of the message data 143, communications system 294 may invoke verification service 295. Verification service 295 may include a ticket generator 275 that generates a new ticket for verification that the contact data should be added to the user account or for verification of some other operation. Generation of the ticket may include adding an entry to a list, table, database, etc. that includes an identification of the user account and the contact data (or operation) to be verified. Code generator 271 then generates a verification code for the generated ticket as detailed herein. The verification code may be non-audio data, which may be stored in the ticket. Encoder 296a encodes the verification code into audio data (e.g., generates an audio representation of the verification code) as detailed herein. Verification service then generates message data 149 and sends the message data 149 containing the audio data that represents the verification code or a link to the audio data to device 115. The message data 149 may additionally include an instruction for a user to place device 110 into a listening mode and/or to issue a verification command to device 110. FIG. 5 illustrates an example message that has been received by device 115. Device 115 plays the audio data within hearing (pick-up) range of the device 110, which has been placed into a listening mode after a user issued a voice command as discussed herein above.

Device 110 generates audio data 293 containing a representation of the audio data that was sent to device 115 in message data 149. The audio data 293 may be received after the communications system 294 has been granted control of or direct access to device 110. Verification service 295 may include a decoder 296b that processes the audio data 293 to extract an audio verification code from the audio data. The decoder 296b may use a same audio coding scheme as encoder 296a that was used to generate the audio verification code. For example, the decoder 296b may convert frequency information, phase information, etc. from the audio data into numerical and/or alphanumerical values. The decoder 296b may receive the audio data 293 as an input and output a non-audio data (e.g., a text) representation of the verification code.

Comparator 297 compares the non-audio representation of the verification code that was extracted from the audio data to one or more stored verification codes (e.g., non-audio data representations of verification codes in one or more tickets). If a match is found between the extracted verification code and a stored verification code, then an associated operation or data (e.g., contact data) may be verified. Action module 299 may then perform an appropriate action depending on the nature of the operation or data that was verified. For example, if an operation to add a phone number or other contact data to a user account was verified, then the phone number or other contact data may be added to the user account, completing the operation. If a purchase transaction was verified, then a message may be sent to a third party (e.g., a reseller) indicating that the validation was successful. The third party may then complete the purchase transaction.

In one embodiment, audio data 293 includes audio data representing a digital signature of the verification code. In such an embodiment, the decoder 296 may extract the digital signature from the audio data in the same manner that the verification code was extracted from the audio data. Signature generator 298 may then use a stored key to generate a digital signature of the extracted verification code. Comparator 297 may compare the generated digital signature to a stored digital signature to determine whether the verification code is from a trusted source. If the verification code is from a trusted source and the verification code matches a stored verification code, then action module 299 may be invoked.

FIG. 2C has been described for an embodiment in which audio data 293 was sent directly to server 120b. Alternatively, audio data 193 may be sent to server 120a and forwarded to a command processor associated with the communications system. The command processor may include the decoder 296, and may extract the verification code from the audio data using the decoder and then send the extracted verification code to server 120b. Alternatively, the command processor may forward the audio data to server 120b without extracting the verification code from the audio data.

Figure 3:
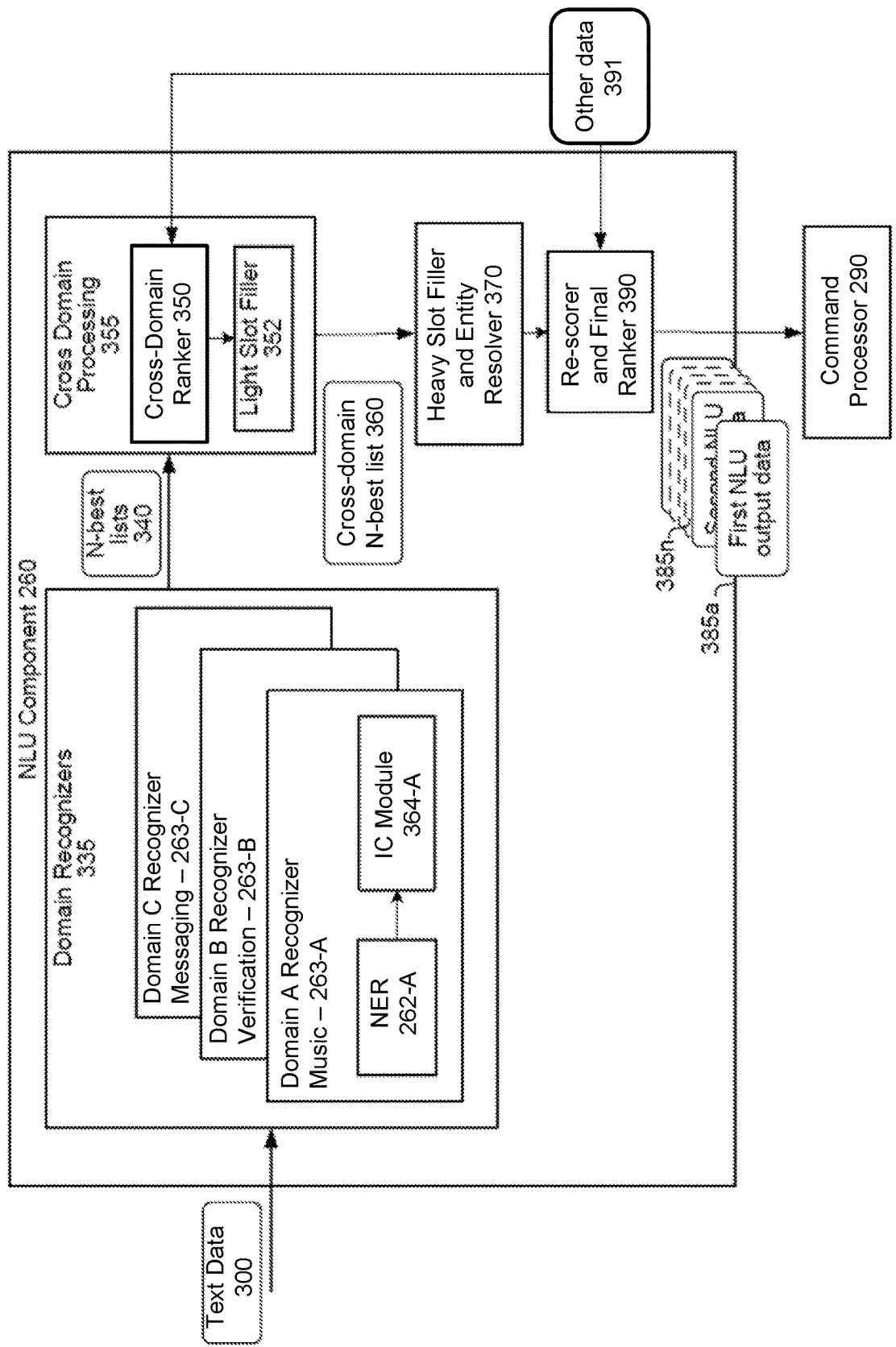
FIG. 3 is a conceptual diagram of a system architecture for parsing incoming utterances using multiple domains according to embodiments of the present disclosure.

The NLU operations described herein may take the form of a multi-domain architecture, such as that illustrated in FIG. 3. In the illustrated architecture, each domain (which may include a set of intents and entity slots that define a larger concept such as music, video, messaging, etc. as well as components such as trained models, etc. used to perform various NLU operations such as NER, IC, or the like) may be constructed separately and made available to the NLU component 260 during runtime operations where NLU operations are performed on text data (such as text data output from the ASR component 250). Each domain may have specially configured components to perform various steps of the NLU operations.

For example, the multi-domain architecture may consist of multiple domains for intents/commands executable by the system 100 (or by other devices connected to the system 100), such as music, video, messaging, and information. The NLU component 260 may include a plurality of domain recognizers 335, where each domain may include its own recognizer 263. Each recognizer 263 may include various NLU components such as an NER component 262, IC component 264, and other components such as an entity resolver, etc.

For example, a music domain recognizer 263-A may have an NER component 262-A that identifies what slots (i.e., portions of input text data) may correspond to particular words relevant to the music domain. The slots may correspond to entities such as (for the music domain) a performer, album name, song name, etc. An NER component 262 may use a machine learning model, such as a domain specific conditional random field (CRF) to both identify the portions of text data corresponding to an entity as well as identify what type of entity corresponds to the text portion. For example, for the text "play songs by the stones," an NER component 262-A trained for a music domain may recognize the portion of text "the stones" corresponds to an entity and an artist name. The music domain recognizer 263-A may also have its own IC component 264-A that determines the intent of the utterance represented in the text data, assuming that the text data is within the proscribed domain. An IC component 264 may use a model, such as a domain specific maximum entropy classifier to identify the intent of the utterance, where the intent is the action the user desires the system to perform.

As illustrated in FIG. 3, multiple domains may operate substantially in parallel, with different domain specific components. That is, domain B for verification may have its own recognizer 263-B including NER component 262-B and IC component 264-B. Domain C for messaging may also have similar components in its recognizer 263-C, and so on for the different domains available to the system 100. When text data 300 (e.g., ASR output text data) is received, the same text data that is input into the NLU pipeline for domain A 263-A may also be input into the NLU pipeline for domain B 263-B, where the components for domain B 263-B will operate on the text data 300 as if the text data 300 related to domain B, the components for domain C 263-C will operate on the text data 300 as if the text data 300 related to domain C, and so on for the different NLU pipelines for the different domains. Each domain specific NLU pipeline will create its own domain specific NLU results, for example NLU results A (for domain A), NLU results B (for domain B), NLU results C (for domain C), and so on. The different NLU results may then be ranked and further processed using other downstream components as explained below.

As shown in FIG. 3, an NER component 262 and IC component 264 may be considered part of a recognizer (such as recognizer 263-A, 263-B, etc.). The recognizers 335 may operate using machine learning trained models such as a CRF, maximum entropy classifier, neural network (such as a deep neural network (DNN) or recurrent neural network (RNN), or other classifier. The recognizers 335 may also use rules that operate on input text data in a particular form to identify named entities and/or intents. The recognizers 335 may also operate using a data structure such as a finite state transducer (FST) to process the text data 300 to perform NER and/or IC. Other techniques or models may also be used to perform NER and/or IC. The techniques may also be used together. For example, a set of rules, an FST, and a trained machine learning model may all operate on text data 300 substantially in parallel to determine the named entities/ intents of an utterance represented in the text data 300. If one technique performs its task with high enough confidence, the system may use the output of that technique over the others. The system may also prioritize the results of different techniques in certain circumstances (for example rules results may be higher priority than FST results, which may be higher priority than model results, or some other configuration). Each recognizer (such as 263-A, 263-B, 263-C, etc.) may have its own rules, FSTs, and/or models operating such that each recognizer operates substantially in parallel to the other recognizers to come up with its own interpretation of the utterance represented in the text data 300.

The output of each recognizer may be an N-best list of intents and slots representing the particular recognizer's top choices as to the meaning of the utterance represented in the text data 300, along with scores for each item in the N-best list. Each recognizer of the recognizers 335 may operate on the text data 300 substantially in parallel, resulting in a number of different N-best lists, one for each domain (e.g., one N-best list for music, one N-best list for video, etc.). The size of any particular N-best list output from a particular recognizer is configurable and may be different across domains.

While the recognizers 335 perform NER (e.g., identify words of the input text data 300 that are important for downstream processing (sometimes called light slot filling), and may even label those words according to type (such as artist name, album name, city, or the like)), the recognizers 335 may not perform entity resolution (i.e., determining the actual entity corresponding to the words of the text data 300). Entity resolution is typically a higher latency process and involves communications with a knowledge base 272 or other component to precisely identify the specific entities. As this process is resource intensive, it may be preferable to not perform this task for each item of every N-best list across the multiple domains as some items have low scores and are unlikely to be used and any resources spent performing entity resolution would be wasted on low scoring items. Thus, a filtering of potential results may first be performed before engaging in more resource intensive processing. To that end, the cumulative N-best lists 340 of all the domains may be passed to a cross domain processing component 355, which may further rank the individual items in the N-best lists 340 as well as perform other operations.

The cross domain processing component 355 may include a cross-domain ranker 350. The cross-domain ranker 350 takes the N-best lists 340 and selects from among the lists the top choices to create a new N-best list that may include items from different domains, but only includes the highest scoring ones of those domains. The purpose of the cross-domain ranker 350 is to create a new list of top scoring potential results, so that downstream (more resource intensive) processes may only operate on the top choices.

As an example of a multi-domain N-best list created by the cross-domain ranker 350, take the example text data 300 of "play the hunger games." The text data 300 may be processed by each of the recognizers 335, and each will output an N-best list, resulting in the group of N-best lists 340 input into the cross domain processing component 355. The cross-domain ranker 350 may then rank the individual items among the N-best lists to create a new N-best list. Each item in the cross-domain N-best list 360 may also include a score. The size of the cross domain N-best list 360 is configurable. While the cross-domain ranker 350 takes as input the N-best lists 340, it may also consider other information, such as other data 391.

The cross domain processing component 355 may also include a light slot filler component 352. The light slot filler component 352 can take text from slots and alter it to make the text more easily processed by downstream components. The operations of the light slot filler component 352 are typically low latency operations that do not involve heavy operations, such as those that require referencing a knowledge base. The purpose of the light slot filler component 352 is to replace words with other words or values that may be more easily understood by downstream components. For example, if the text data 300 includes the word "tomorrow," the light slot filler component 352 may replace the word "tomorrow" with an actual date for purposes of downstream processing. Similarly, a word "CD" may be replaced by a word "album." The replaced words are then included in the cross domain N-best list 360.

The cross-domain N-best list 360 is output to a heavy slot filler and entity resolver 370. This component 370 can apply rules or other instructions to standardize labels or tokens from previous stages into an intent/slot representation. The precise transformation may depend on the domain (for example, for a travel domain a text mention of "Boston airport" may be transformed to the standard BOS three-letter code referring to the airport). The entity resolver 370 can refer to an authority source (such as a knowledge base 272) that is used to specifically identify the precise entity referred to in the entity mention identified in the incoming text. Specific intent/slot combinations may also be tied to a particular source, which may then be used to resolve the text (such as by providing information or a command to be executed in response to a user utterance). In the example "verify operation for John Smith," the entity resolver 370 may reference to a personal list of operations and/or data to be verified, or the like. The output from the entity resolver 370 may include an altered N-best list that is based on the cross-domain N-best list 360 but also includes more detailed information about the specific entities mentioned in the text (such as specific entity IDs) and/or more detailed slot data that can eventually be used by a command processor 290 which may be incorporated into the same system components or pipeline or may be on a separate device in communication with the system. While illustrated as a cross-domain resolver, multiple entity resolvers 370 may exist where a particular entity resolver 370 may be specific for one or more domains.

As can be appreciated, the entity resolver 370 may not necessarily be successful in resolving every entity and filling every slot. This may result in incomplete results in the combined N-best list. A final ranker 390 may consider such errors when determining how to rank the ultimate results for potential execution. For example, if an item of the cross-domain N-best list 360 comes from a book domain and includes a read book intent, but the entity resolver 370 cannot find a book with a title matching the input query text, that particular result may be re-scored by the final ranker 390 to be given a lower score. Each item considered by the final ranker 390 may also be assigned a particular confidence, where the confidence may be determined by a recognizer 263, cross domain processing component 355, or by the final ranker 390 itself. Those confidence scores may be used to determine how to rank the individual NLU results represented in the N-best lists. The confidence scores may be affected by unfilled slots. For example, if one domain is capable of filling a slot (i.e., resolving the word in the slot to an entity or other recognizable form) for an input utterance, the results from that domain may have a higher confidence than those from a different domain that is not capable of filling a slot.

The final ranker 390 may be configured to apply re-scoring, biasing, or other techniques to obtain the most preferred ultimate result. To do so, the final ranker 390 may consider not only the NLU results of the N-best lists, but may also consider other data 391. This other data 391 may include a variety of information. For example, the other data 391 may include application rating or popularity data. For example, if one application has a particularly high rating, the final ranker 390 may increase the score of results associated with that particular application. The other data 391 may also include information about applications that have been specifically enabled by the user (as indicated in a user profile 204, discussed in reference to FIG. 2A). NLU results from enabled applications may be scored higher than results from non-enabled applications. User history may also be considered, such as if the user regularly uses a particular application or does so at particular times of day. Date, time, location, weather, type of device 110, user ID, context, and other information may also be considered. For example, the final ranker 390 may consider when any particular applications are currently active (such as music being played, a game being played, etc.). The highest scoring result (or results in the case of multiple commands being in an utterance) may be passed to a downstream command processor 290 for execution.

Following final ranking, the NLU component 260 may output NLU output data 385. The NLU output data 385 may include an indicator of the intent of the utterance along with data associated with the intent, for example an indication that the intent is "play music" and the music to be played is "Adele." The NLU output data 385 may be in the form of previous NLU data such as an item(s) in the N-best lists 340, an item(s) in the cross-domain N-best list 360, or the like. The NLU output data 385 may also be in a format executable by the command processor 290. Multiple instances of NLU output data (e.g., 385a-385n) may also be output.

Returning to FIG. 2A, a user profile storage 204 may include data regarding user accounts. The user profile storage 204 may be located proximate to the server 120a and/or to server 120b, or may otherwise be in communication with various components, for example over the network(s) 199. The user profile storage 204 may include a variety of information related to individual users, accounts, etc. that interact with the system 100. For illustration, the user profile storage 204 may include data regarding the devices associated with particular individual user accounts, the phone numbers associated with user accounts, voice print identification data (e.g., data that is useable to identify a specific user based on recordings of his or her voice) and so on. User profile storage 204 may additionally include user defined rules on when to automatically request verification of operations. For example, a user profile may include a rule to automatically perform verification of purchases over $1000. In an example, the user profile storage 204 is a cloud-based storage. Each user profile may include data such as names of contacts. Each contact may be associated with one or more devices, and each device may be associated with a respective service provider (e.g., a telephony and messaging service provider/carrier). Moreover, each contact device may be associated with data indicating the types of messaging supported by the device. In addition, each service provider/carrier may be associated with data indicating the types of messaging supported by the service provider/carrier.

Figure 4A:
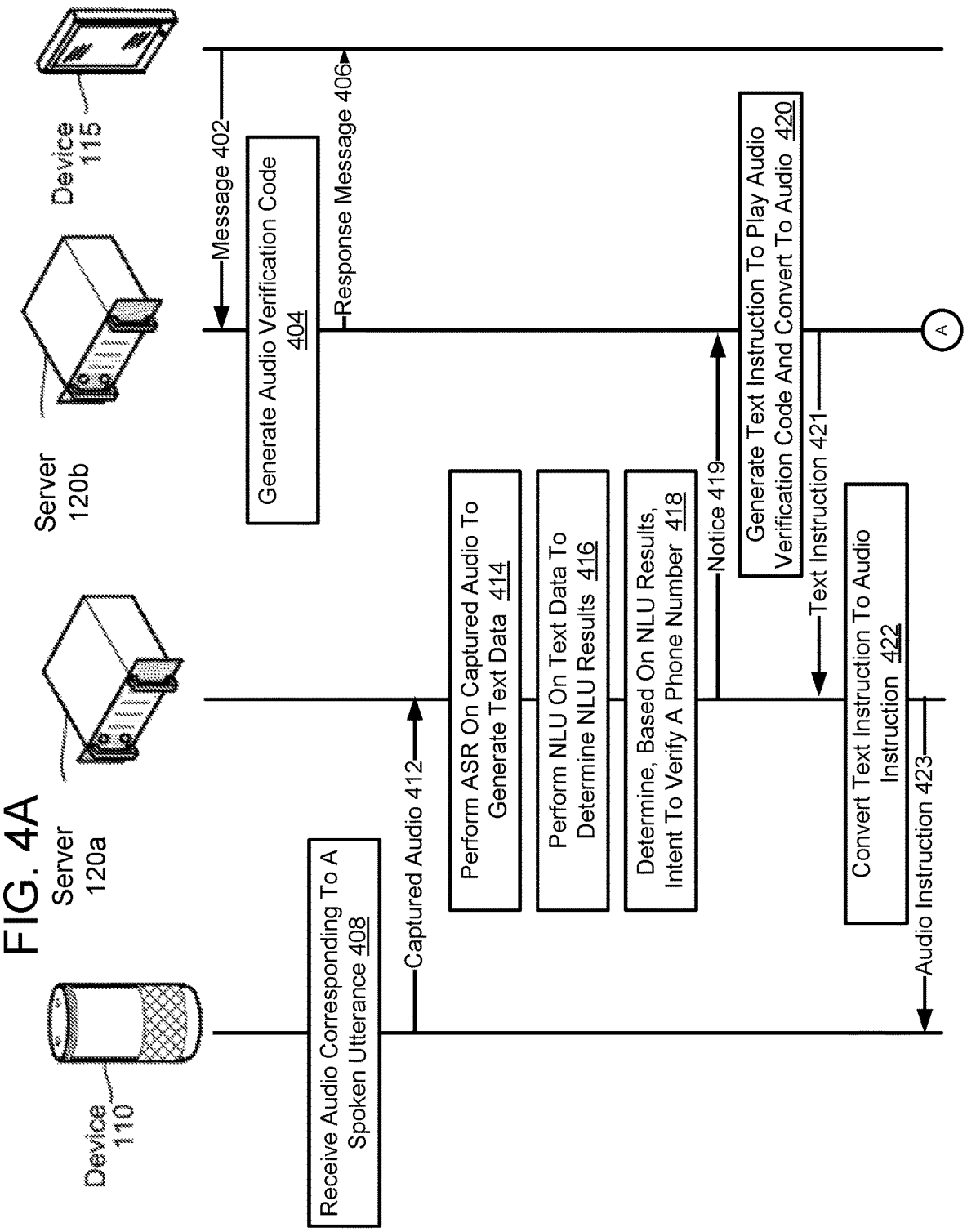

FIGS. 4A-4B illustrate a sequence diagram showing the verification of an operation (e.g., for linking a phone number to a user account) using audio data. To initiate the sequence, device 115 sends a message 402 to server 120b, which may be a server for a communications system. In one embodiment, the device 115 sends the message 402 to the server 120b without a user having to input a phone number or other contact information of the server. The user may simply press a verify phone number button in an application on the device 115 in some embodiments. This may cause the application to call a messaging application on the device (e.g., an SMS application or MMS application) to send the message. Alternatively, this may cause the application to initiate a phone call or video call to a phone number associated with the server 120. The message or phone call functions as a request for verification in embodiments. The message may be a text message such as an SMS message or an MMS message. The message or phone call may be sent to a phone number used by the server 120b to receive verification requests, the message may be sent to an email address used by the server 120b to receive verification requests, or the message may be sent using an API of the server 120b. The message may be a synchronous or asynchronous message in accordance with a synchronous communication protocol (e.g., a phone call or video call) or in accordance with an asynchronous communication protocol (e.g., text messaging, audio messaging, voice mail messaging, and so on). The message includes a phone number of the device 115 in one embodiment, which may be used to respond to the message. If a phone call is made, then the server 120b will be notified of a phone number of the calling device.

Receipt of the message 402 causes server 120b to begin a verification operation for the phone number of the device 115. The server 120b may generate an audio verification code at block 404. The audio verification code is a unique code generated for a particular verification request in some embodiments. The audio verification code may be a numerical or alphanumeric value that is uniquely generated for the verification of the phone number, and which has been converted to an audio format. To generate the audio verification code, the domain first generates the numerical or alphanumeric code as text. The code may be generated using a random number generator in embodiments. In one embodiment, the generated number is then processed using a cryptographic hash function to produce the verification code. The server 120b then uses an encoder to encode the verification code into audio data (referred to as the audio verification code). The audio data may be an audio file, such as a moving picture experts group audio layer III (MP3) file, a waveform audio (WAV) file, an advanced audio coding (AAC) file, and so on. The server 120b may then invoke a verification service and notify the verification service of the verification code to be used for verification. The verification service may include multiple open verification requests, and may wait to receive the verification code.

In an alternative embodiment, the server 120b calls the verification service, and the verification service opens a new verification request and generates an audio verification code at block 404. The verification service then uses an encoder to encode the verification code into audio data (referred to as the audio verification code). The verification service may then provide the audio verification code to, for example, a messaging domain or a verification domain for transmission to a device.

The server 120b then sends a response message 406 that includes the audio verification code or a link to the audio verification code back to the device. The server 120b may generate a response message that includes the audio verification code, and send the response message back to the phone number of the device using the same messaging protocol that was used to receive the message from the device 402. For example, the response message that includes the audio verification code may be an SMS message or MMS message. In some instances, the response message includes a link to the audio verification code rather than an audio file with the audio verification code. The device 115 may access this link to receive the audio verification code.

The response message may additionally include instructions to say a particular phrase to place speech-detection device 110 into a listening mode and/or to provide a specific oral command to the speech-detection device 110. For example, the response message may instruct the user to say "Device X, verify phone number." The user of device 115 may speak the particular phrase, which the speech-detection device 110 receives at block 408 via one or more mics. This causes the device 110 to enter a listening mode. Additionally, the phrase may be captured by device 110 and captured audio 412 (e.g., audio data comprising an audio recording or stream containing an utterance of the phrase) may be sent to server 120a for analysis 112. Server 120a may be a server for a speech processing system. The server 120a may process the captured audio to identify a particular domain or service to activate (e.g., a verification domain or service).

In one embodiment, the captured audio is processed by user recognition component 295 to determine an identity of the speaker. Once the speaker is identified, a speaker ID is determined.

In one embodiment, at block 414 the server performs ASR on the captured audio to generate text data (e.g., to generate text data comprising the text, "Device X, verify phone number." At block 416, the server 120a performs NLU on the text data to determine NLU results. The server 120a may determine (418), based on the NLU results, an intent to verify a phone number or another operation. For example, for text data corresponding to "verify phone number," the server 120a may determine the utterance corresponds to a "verify phone number intent." The NLU may pass the verify phone number intent to a verification domain or a messaging domain (e.g., if the phone number is to be verified for the messaging domain). This intent may be passed to the appropriate domain via notice 419 along with additional metadata such as a device ID of device 110, the device ID of device 115, a speaker ID of a speaker who spoke the voice command, and so on.

The device 110 and device 115 may be associated with the same user account on server 120a and/or sever 120b. Accordingly, server 120a (e.g., the verification domain or messaging domain) may determine that the earlier request message 402 that was received from device 115 to verify a phone number is related to the verify phone number intent. Server 120a may determine, therefore, the particular phone number to be verified. Server 120a may determine that a verification code was generated for the phone number verification, and that an audio verification code is expected. Alternatively, such determinations may not be made by server 120b.

Server 120b may generate at block 420 a text instruction to play the audio verification code and send the text instruction 421 to server 120a. Server 120a may then perform text to speech processing to convert the text instruction into an audio instruction (e.g., a spoken word instruction) at block 422. The server 120a then sends the audio instruction 423 to device 110, which outputs the audio instruction. For example, the device 110 may state, "please play the audio verification code." Subsequently, device 115 plays the audio verification code 424 within pickup range of the device 110. For example, a user may click on or select an audio file comprising the audio verification code or a link to the audio verification code that was included in the response message to the device 115. This may cause the device 115 to play the audio verification code 424.

The played audio verification code is received by one or more mics on device 110 and captured. The captured audio 425 of the audio verification code is sent from the device 110 to the server 120b. In one embodiment, while the device 110 is in a listening mode all audio captured by the device 110 is streamed from device 110 to server 120b.

Server 120b may decode a portion of the captured audio corresponding to the audio verification code (block 428). Server 120b may provide this portion of the captured audio to a decoder, which extracts the verification code from the portion of the captured audio (block 430).

In one embodiment, a command processor of the server 120a invokes a callback function to a verification service in server 120b and provides the verification code to the verification service. The verification service may include multiple open verification requests also referred to herein as tickets, and may determine which open verification request is associated with the verification code. In one embodiment, the callback function is for the specific verification code, and calls the open verification request associated with the verification code. Upon receiving the verification code for the open verification request, the verification service compares the extracted audio verification code to the stored audio verification code to determine whether the two audio verification codes match (block 432). Responsive to determining that the audio verification codes match, the verification service verifies the phone number or verifies the requested operation (block 434). This may indicate that the requested verification is complete, and that verification was successful. The server 120b (e.g., the verification domain or messaging domain) may then proceed with a requested operation, such as linking a particular phone number to a user account. The operation may have been initiated by a user, and the verification may indicate that the user had authorization to perform or complete the operation. Verification of a phone number or other contact data may include linking the phone number or other contact data to the user account associated with the device 115 and/or the device 110. This may enable the device 115 and/or device 110 to perform one or more operations using the phone number. For example, this may enable the device 110 to make or receive VOIP phone calls to the phone number via a messaging domain of server 120b.

As noted, the device 115 and the device 110 may both be associated with a user account. Alternatively, just the device 110 may be registered to the user account or just the device 115 may be registered to the user account. The fact that the device 115 was able to receive the audio verification code at a particular phone number, and that the device 110 was able to also receive the audio verification code played by device 115, and provide it back to server 120b, confirms to server 120b that the user has access to both device 110 and device 115. This additionally confirms that the user has access to the phone number that he or she is claiming ownership of. This therefore confirms that the person who claimed to have a particular phone number actually has that phone number. This prevents users from falsely claiming phone numbers not belonging to them.

The server 120a may also identify a user that spoke the utterance (provided the voice command). Identifying the user may involve processes detailed with respect to the user recognition component 295 discussed above. Identifying the user may also include the system prompting the user to speak user identifying information, such as the user's name, user's system unique ID, etc. This may be another level of verification.

The above described flow may be reversed such that the audio verification code is sent to device 110, played by device 110 and recorded by device 115. For example, a user may issue a command of "Device, verify operation" to device 110. A recording of this voice command may be sent to server 120a and processed by the ASR and NLU to determine that the user intent is to verify an operation. This intent may be passed on to a verification domain or messaging domain, for example. The verification domain or messaging domain would call the verification service to open a verification request. The verification service or appropriate domain would generate the audio verification code and provide it to device 110. The user would place the device 115 into a listening mode, and the device 110 would play the audio verification code. The device 115 may capture the audio verification code and then provide the captured audio of the audio verification code to server 120a or server 120b for verification. The server may extract the verification code and execute a callback function to the verification service. The verification service may verify that the extracted verification code matches a stored verification code and then execute a callback function to the appropriate domain.

FIG. 5 illustrates an example of a text message received by a mobile phone after requesting verification of a phone number. The device 115 may include a display 103 that presents message payloads as well as other content. The display 103 may present a SMS message or other message including message content 502 in the form of text. The received text message includes message content 502 with instructions to place a speech-detection device into listening mode. The message may include text stating, for example, "say the following to your speech-detection device, "device X, verify phone number." In one embodiment, the message content 502 includes audio that comprises a wake word and/or instructions. The text message additionally includes a link 504 to message content audio data, which may be displayed. The link 504 may be text, an icon, or any other type of visual data that may operate as a link. The message content audio data may be audio data comprising an audio verification code. The message content may additionally include audio comprising a wake word that will place the speech-detection device into a listening mode. The wake word may precede the audio verification code in the audio data. In one embodiment, the audio data may is in the message. In such an embodiment, the message may be, for example, an MMS message.

Embodiments have been discussed above with reference to verifying a phone number to link that phone number to a user account. However, the methods, techniques and systems described wherein with reference to phone number verification can also be used to verify other types of information, operations and transactions. For example, audio data may be used to verify purchases, to verify that a person has access to an area or to specific data, and so on.

Figure 6:
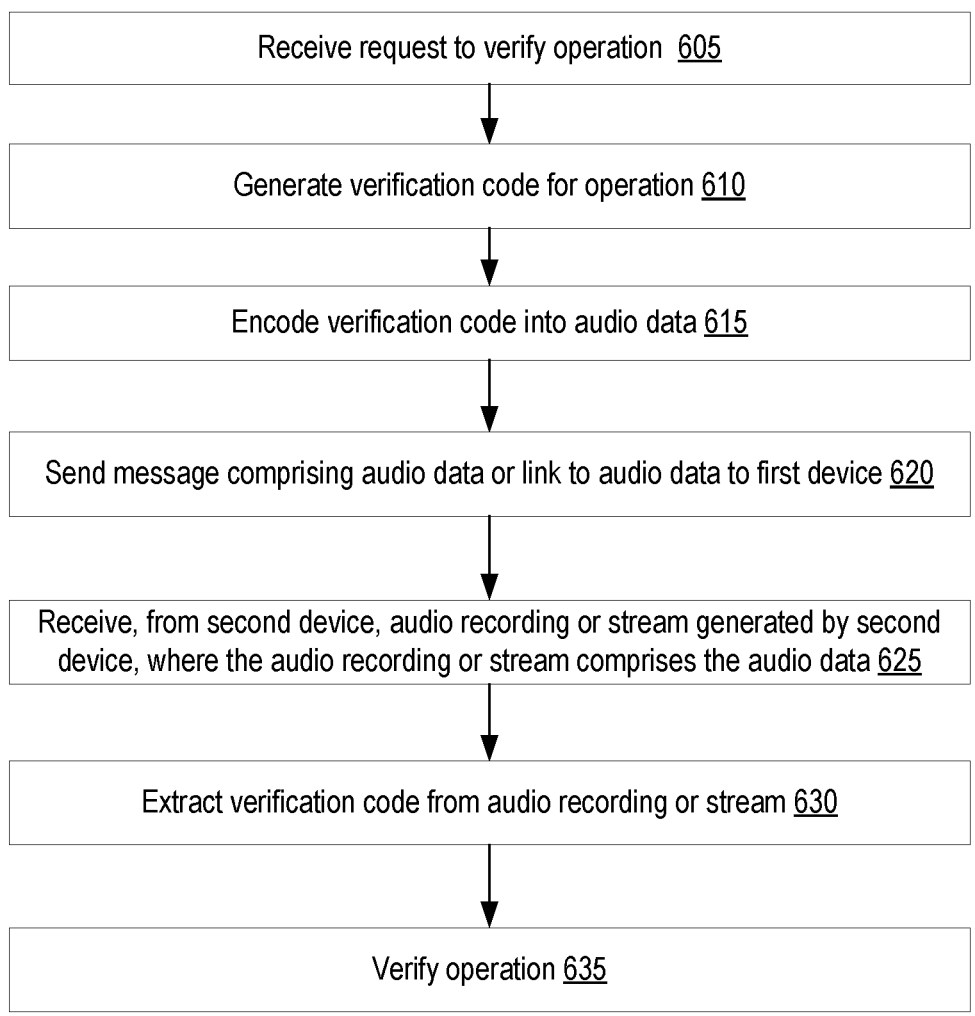
FIG. 6 is a flow diagram illustrating a method for verifying an operation using an audio verification code according to embodiments of the present disclosure.
Figure 7:
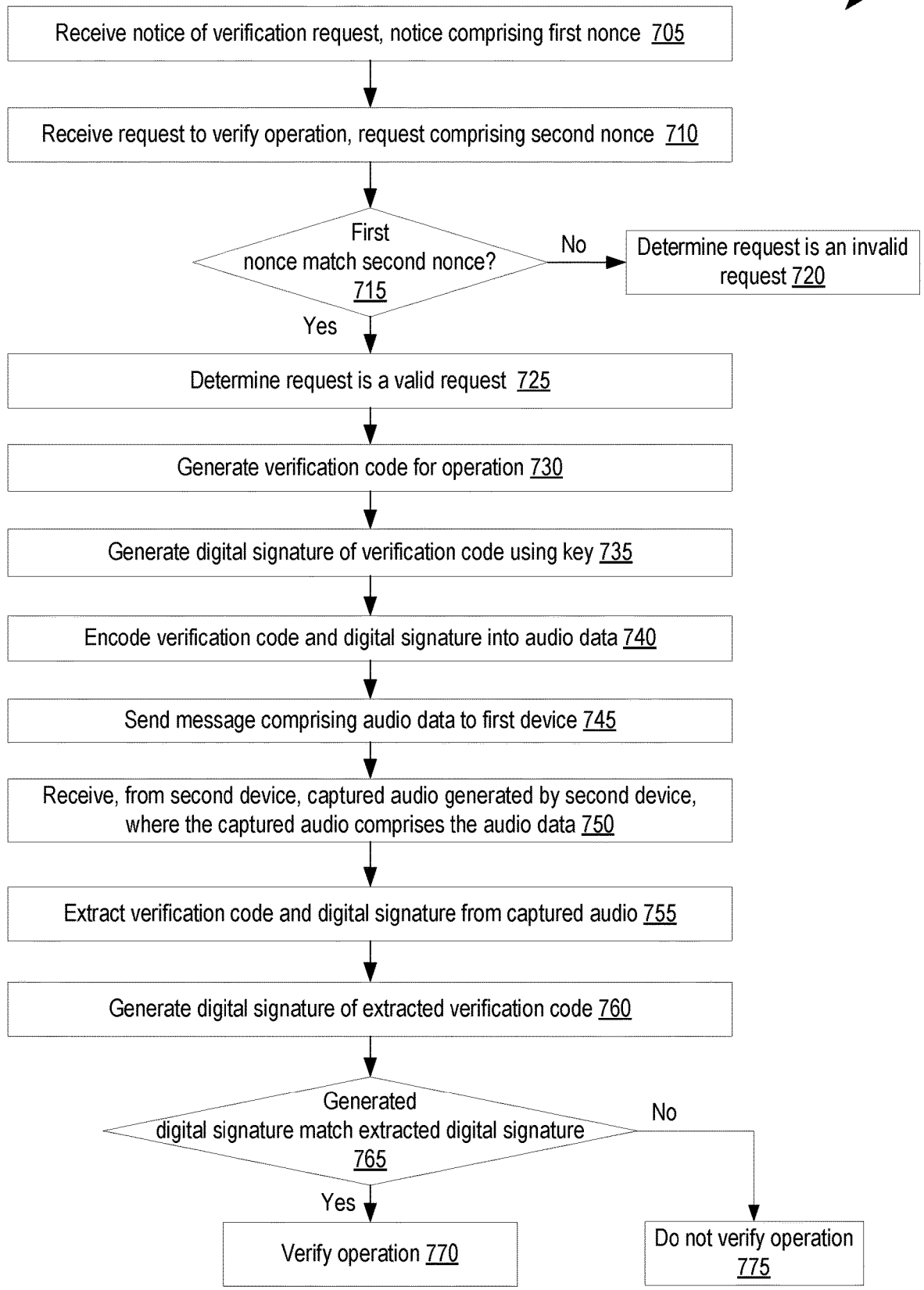
FIG. 7 is a flow diagram illustrating an additional method for verifying an operation using an audio verification code according to embodiments of the present disclosure.
Figure 8:
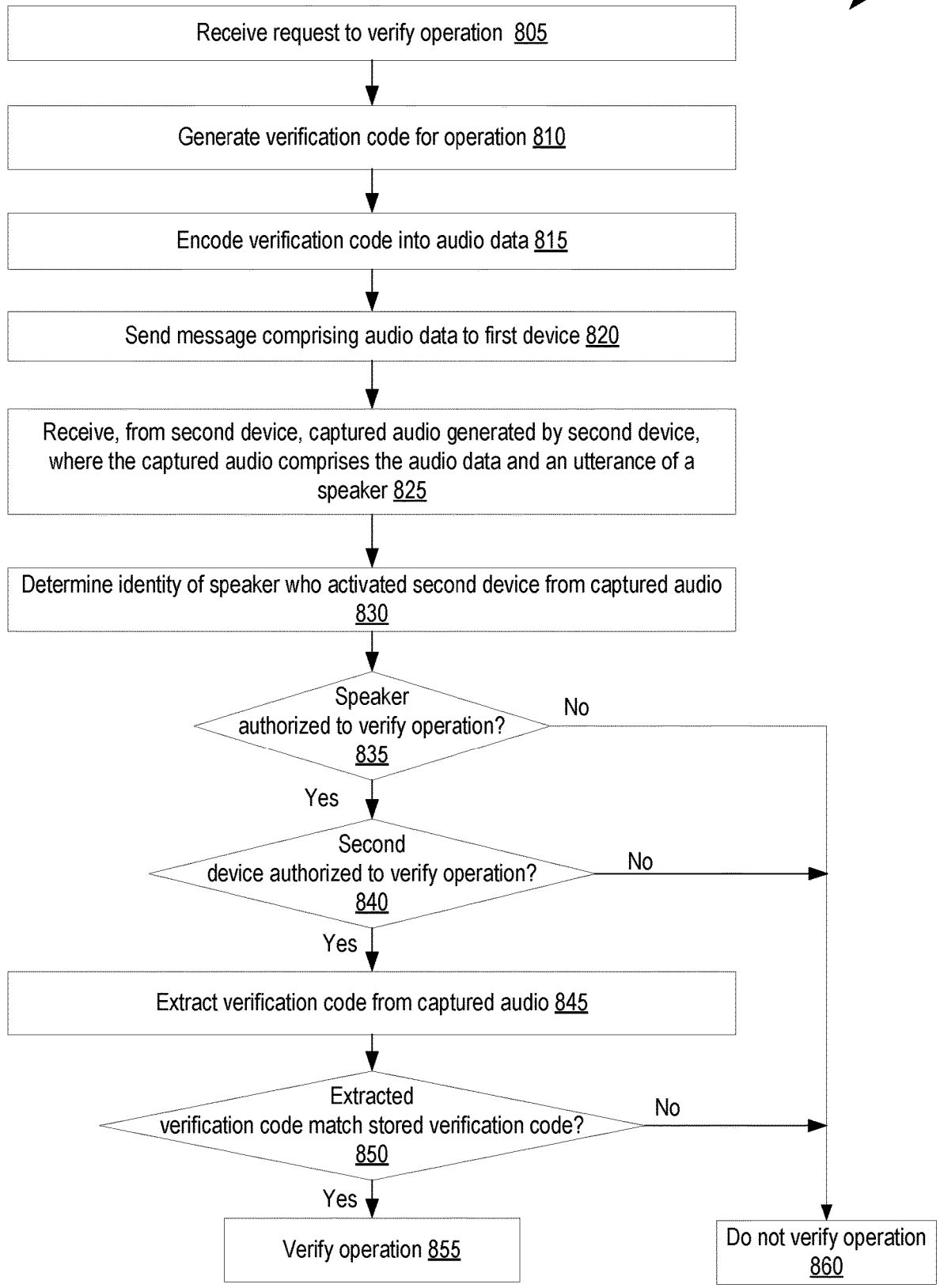
FIG. 8 is a flow diagram illustrating an additional method for verifying an operation using an audio verification code according to embodiments of the present disclosure.

FIGS. 6-8 are flow diagrams illustrating methods for verifying an operation using an audio verification code according to embodiments of the present disclosure. The methods may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by server(s) 120a-b of FIG. 1.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 6 is a flow diagram illustrating a method 600 for verifying an operation using an audio verification code according to embodiments of the present disclosure. The operation may have been initiated by a user who may or may not have authorization to perform the operation. At block 605 of method 600, processing logic receives a request to verify an operation. The request may be received as first message data, which may represent a request. This request may be received from a third party server or from an associated server of processing logic. For example, third parties may request verification of purchase transactions that have been generated on websites of those third parties. In one embodiment, a child may go shopping, and that child may have access to a parent's user account. That child may make a purchase under the user account. The purchase may not be confirmed, however, until a verification process is completed for that purchase, as described herein. The request may also be received from a user who wishes to access data or to perform some restricted action. The request may also be a request to link a phone number to a user account (to verify a phone number). In such an embodiment, the request may include a phone number to verify. This phone number may be included in the request message (e.g., if the request message is received via an SMS or MMS message from the phone number). The phone number may also be determined by a device 115 using an API for determining the device's phone number. The request may be received via an email, a text message, an instant message, an API call, or any other type of message.

At block 610, processing logic (e.g., a domain, skill or service) generates a verification code for the operation. The verification code may be generated using a random number generator, pseudorandom number generator, or other type of code generator. The verification code may be a numerical value, an alphanumeric value (e.g., a hexadecimal value), or other text based or binary value. In some embodiments, a random value is first generated, which is then processed using a cryptographic hash function to result in the verification code. The verification code may be generated in the form of a first text version of the verification code, which may be stored for later comparison.

At block 615, the verification code is encoded into audio data. This may include generating first audio data representing the verification code and/or adding the first audio data to an existing audio file. The audio data may contain just an audio version of the verification code or an audio version of the verification code along with other audio data. For example, the audio verification code may in the ultrasonic frequency range (e.g., above 20,000 Hz) and the audio data may also include additional audio at frequencies audible to the human ear (e.g., audible frequency range of 20-20,000 Hz). The additional audio may include spoken instructions or information, a song, a pleasant tone, and so on. The audio verification code and the additional audio may be superimposed in the audio data so that they will play at the same time.

At block 620, message data comprising the audio data or a link to the audio data is sent to a first device. The first device may be a mobile device such as a mobile phone, a tablet computer, a laptop computer, and so on. The first device may also be a traditionally immobile device such as a desktop computer. The first device may also be a speech-detection device, such as an Amazon Echo, a Google Home, an Apple HomePod, etc. The message data may be sent to an email address, to a phone number, to a particular device ID, and so on. The audio data may be a file attached to the message or may be a link (e.g., a URL) in the message that points to the audio data. If the message data is sent to an email address, then the first device may have access to the email address and may download the message from the email address.

At block 625, processing logic receives from a second device second audio data representing the first audio data. This may be an audio recording or stream that was generated by the second device. The second device may be a mobile device such as a mobile phone, a tablet computer, a laptop computer, and so on having a speech-detection application installed thereon. The second device may also be a traditionally immobile device such as a desktop computer having a speech-detection application installed thereon. The second device may also be a speech-detection device, such as an Amazon Echo, a Google Home, an Apple HomePod, etc. The second message data may be generated by the second device when the first device plays the audio data. Accordingly, the second message data will comprise a representation of the first audio data. The second device may be a speech-detection device or a device that has a speech-detection application installed thereon. The speech-detection device or application may capture the playback of the first audio data and send a recording or stream to a server comprising the processing logic.

At block 630, processing logic extracts the verification code from the audio recording or stream. This may include processing the second audio data using a decoder to generate a second text version of the verification code. At block 635, processing logic determines that the extracted verification code matches the verification code that was generated for the operation and verifies the operation. In one embodiment, the extracted verification code (second text version of the audio verification code) is compared against a particular verification code (first text version of audio verification code), or some or all verification codes that have been generated and that have not yet been matched to an extracted verification code. A match may be found when a value of the first text version of the audio verification code is equal to a value of the second text version of the audio verification code. When a matching verification code is identified, a user account associated with the identified verification code is determined, one or more verification conditions associated with that user account may then be determined. Such verification conditions may include a user verification condition, a device verification condition, a phone number verification condition, a location verification condition, and so on.

For a device verification condition, the second device may be configured as an approved device that is authorized to verify operations for a particular user account. The second device may be linked to the user account, and the second device may be identified in the user account as such an authorized device. The second device may have a unique device ID or a unique application ID for an application installed on the second device. For example, the second device may be a speech-detection device having a fixed approved location in a user's home. Accordingly, any audio verification codes received from the second device may be assumed to be approved by the user associated with the user account since presumably only that user or someone authorized by that user would have access to the second device.

For a user verification condition, voice data may be received from a user of the second device and used to verify an identity of the user using voice print identification and/or successful answers to one or more questions asked to verify the user's identity. If the user is listed in the user account as authorized to verify operations, then verification may be performed.

For a location verification condition, information from the second device may be used to verify a location of the second device. For example, the second device may include a global positioning system (GPS) receiver, which may be used to determine a location of the second device. Alternatively, or additionally, the second device may use one or more wireless communication technologies to communicate with one or more cell towers or Wi-Fi access points. Processing logic may use triangulation to determine the location of the second device. Alternatively, or additionally, the second device may be on a local area network (LAN) having a particular internet protocol (IP) address, and the second device may be associated with that IP address. The IP address may be used to determine the location of the second device (e.g., the IP address may be listed as the home IP address for a user account).

For a phone number verification condition, the audio data comprising the audio verification code may be sent to a particular phone number that is listed as an approved phone number for verification purposes in the user account. If the audio verification code is then received by the second device, this may confirm that the owner of the phone number received and approved the operation to be verified.

The operation to be verified may be an operation that was initiated by a user who may or may not have authorization to perform the operation. The verification may indicate that the user who initiated the authorization did have authorization to perform or complete the operation, or that a second user authorizes the operation after the operation was initiated. Verification of an operation may include sending a message to a domain or application notifying the domain or application that the operation was successfully verified. In the example of a purchase transaction, processing logic may determine that the purchase is approved and send a notice to a requesting system indicating that the purchase is approved. Example operations include operations to add data to an account (e.g., to associate a phone number with a user account) and transactions associated with a user account (e.g., a purchase transaction associated with a user account). In the case of a purchase transaction initiated on a third party system, processing logic may sent a message to the third party system confirming that the entity that initiated the purchase transaction has authorization to complete the purchase transaction, or that the purchase transaction is otherwise to be completed.

FIG. 7 is a flow diagram illustrating an additional method 700 for verifying an operation using an audio verification code according to embodiments of the present disclosure. At block 705 of method 700, processing logic receives a notice of a verification request. The notice may include a nonce, which may be a unique one time value associated with the verification request. The notice may be received from an application running on a device (e.g., on a mobile phone of a user). At block 710, processing logic receives a request to verify an operation. The request may include a second nonce.

At block 715, processing logic compares the first nonce to the second nonce. If the two nonces match, then the method may continue to block 725. If the nonces do not match, then the method proceeds to block 720 and processing logic determines that the request is an invalid request. This may ensure that only authorized applications or systems are able to request verification. These operations may be performed, for example, by a verification domain or communication domain as described herein.

At block 725, processing logic determines that the request is a valid request. At block 730, processing logic generates a verification code for the verification request. At block 735, processing logic generates a digital signature of the verification code using a key (which may be a private key). The digital signature may be used to verify that a verification code is not modified by a recipient. In one embodiment, the digital signature is a cryptographic hash of the verification code. The digital signature may be, for example, a message authentication code (MAC) such as a keyed-hash message authentication code HMAC. To generate the digital signature of the verification code, processing logic may use a key generation algorithm to select a key from a key space. The key may be chosen from the key space at random. The key space represents all the possible permutations for keys. The key space may be a predefined space, such as all 8 digit integers, for example. In another example, the key space may be 256 bits (thus containing 2^256 or 71.579e77 possible keys) or another number of bits. Once the key is generated, a cryptographic hash function may be applied to the verification code along with the key. This may generate a cryptographic hash that acts as a digital signature. This digital signature may later be used to verify the verification code by comparing the digital signature with a new digital signature generated from the verification code and the key using the cryptographic hash function. At block 740, processing logic encodes the verification code and the digital signature into audio data. This may include generating first audio data that represents the verification code and third audio data that represents the digital signature using an encoder.

At block 745, processing logic sends a message comprising the audio data (or a link to the audio data) to a first device (e.g., to a mobile phone, tablet computer, speech-detection device, etc.). At block 750, processing logic receives, from a second device (e.g., to a mobile phone, tablet computer, speech-detection device, etc.), captured audio (e.g., an audio recording or stream) generated by the second device. The captured audio may be second audio data that represents the first audio data and the third audio data. The captured audio therefore includes the first audio data and third audio data, which was played by the first device in the vicinity of the second device. At block 755, processing logic extracts the verification code and the digital signature from the captured audio using a decoder that corresponds to the encoder that was used to encode the digital signature and verification code into an audio format. At block 760, processing logic generates a new digital signature of the extracted verification code using the key.

At block 765, processing logic compares the generated digital signature to the extracted digital signature. This operation may be performed, for example, by a verification service that is called by a verification domain or messaging domain. If the generated digital signature that was generated from the extracted verification code matches the extracted digital signature, then processing logic determines that the verification code is validated. Processing logic then proceeds to block 770, and the operation is verified. If the generated digital signature fails to match the extracted digital signature, then the method proceeds to block 775, and the operation is not verified.

FIG. 8 is a flow diagram illustrating an additional method 800 for verifying an operation using an audio verification code according to embodiments of the present disclosure. At block 805 of method 800, processing logic receives a request to verify an operation. Processing logic may open a verification request in response. At block 810, processing logic generates a verification code for the operation. The verification code may be generated by an appropriate domain or by a verification service that is called by a domain. At block 815, processing logic encodes the verification code into audio data. At block 820, processing logic sends a message comprising the audio data (or a link to the audio data) to a first device.

A user causes the first device to play the audio data in the vicinity of a second device, which records the playback of the audio data. Processing logic then receives, from the second device, captured audio generated by the second device, where the captured audio comprises the audio data and potentially an utterance of a speaker. The speaker may have given a voice command to the second device prior to playing the audio data on the first device. The command may have been a wake command and/or a verification command, for example.

At block 830, processing logic determines an identity of the speaker who activated the second device from the captured audio. Alternatively, the identity of the speaker may be determined by generating textual questions, converting the textual questions to audio files containing spoken questions, providing the audio files to the second device, receiving additional recordings comprising voice responses of the user, converting the voice responses to text responses, and identifying the user ID from the text responses. At block 835, processing logic determines whether the user is authorized to perform the verify operation. For example, a user profile may include one or more verification rules, which may specify a specific user who is able to perform verifications, a particular device that is able to perform verifications, and so on. If the user is authorized to perform verifications, the method continues to block 840. Otherwise, the method proceeds to block 860 and the operation is not verified.

At block 840, processing logic may determine whether the second device is authorized to perform the verify operation. This may be determined by comparing a device ID of the second device to a verification rule in the user profile. If the second device is authorized to perform the verify operation, the method continues to block 845. Otherwise the method continues to block 860.

At block 845, processing logic extracts the verification code from the captured audio. At block 850, processing logic determines whether the extracted verification code matches a stored verification code (e.g., associated with an open verification request). If so, the method continues to block 855, and the operation is verified. Otherwise, the method proceeds to block 860, and the operation is not verified.

Figure 9:
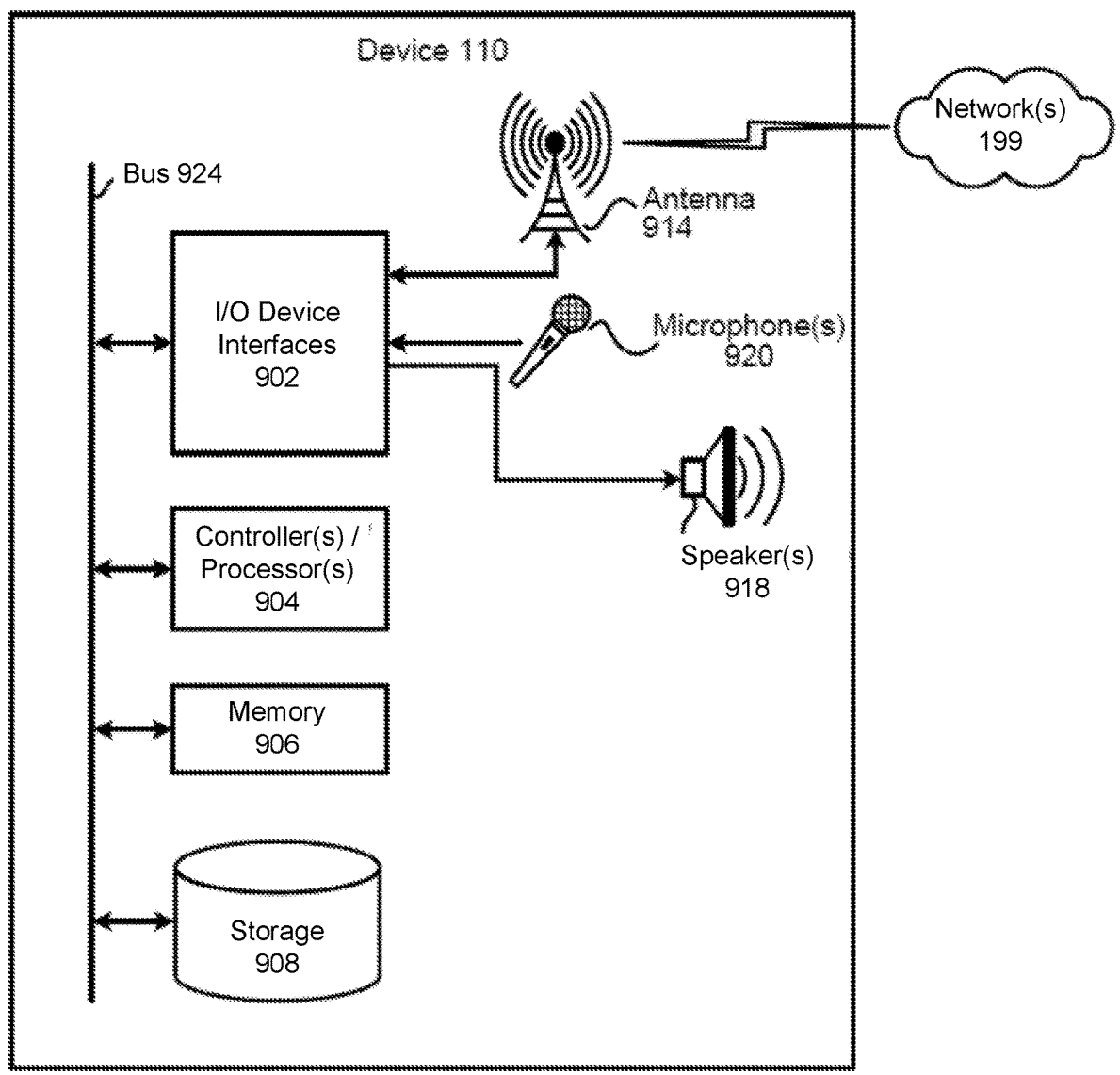
FIG. 9 is a block diagram conceptually illustrating example components of a device according to embodiments of the present disclosure.
Figure 10:
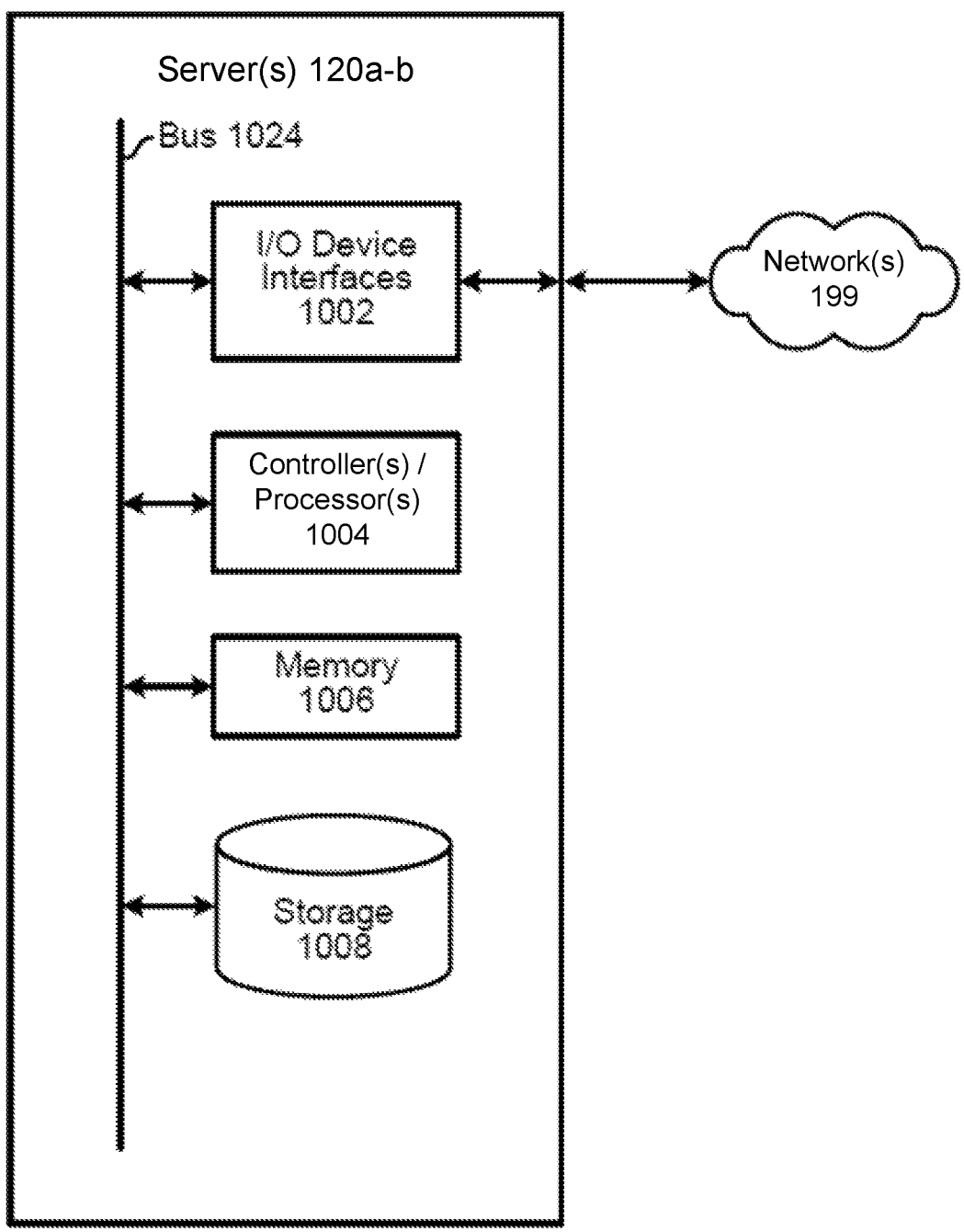
FIG. 10 is a block diagram conceptually illustrating example components of a server according to embodiments of the present disclosure.

FIG. 9 is a block diagram conceptually illustrating a user device, such as the device 110 and/or device 115, that may be used with the described system 100. FIG. 10 is a block diagram conceptually illustrating example components of a remote device, such as the server(s) 120, which may assist with ASR processing, NLU processing, or command processing. Multiple servers 120*a-b* may be included in the system 100, such as one server for performing ASR, one server for performing NLU, etc. In operation, each of these devices (or groups of devices) may include computer-readable and computer-executable instructions that reside on the respective device 110, 115, 120*a-b*, as will be discussed further below.

Each of these devices 110, 115, 120*a-b* may include one or more controllers/processors 904, 1004, which may each include a central processing unit (CPU) for processing data and computer-readable instructions, and a memory 906, 1006 for storing data and instructions of the respective device. The memories 906, 1006 may individually include volatile random access memory (RAM), non-volatile read only memory (ROM), non-volatile magnetoresistive (MRAM), and/or other types of memory. Each device 110, 115, 120*a-b* may also include a data storage component 908, 1008 for storing data and controller/processor-executable instructions. Each data storage component 908, 1008 may individually include one or more non-volatile storage types such as magnetic storage, optical storage, solid-state storage, etc. Each device 110, 115, 120*a-b* may also be connected to removable or external non-volatile memory and/or storage (such as a removable memory card, memory key drive, networked storage, etc.) through respective input/output device interfaces 902, 1002.

Computer instructions for operating each device 110, 115, 120*a-b* and its various components may be executed by the respective device's controller(s)/processor(s) 904, 1004, using the memory 906, 1006 as temporary "working" storage at runtime. A device's computer instructions may be stored in a non-transitory manner in non-volatile memory 906, 1006, storage 908, 1008, or an external device(s). Alternatively, some or all of the executable instructions may be embedded in hardware or firmware on the respective device in addition to or instead of software.

Each device 110, 115, 120*a-b* includes input/output device interfaces 902, 1002. A variety of components may be connected through the input/output device interfaces 902, 1002, as will be discussed further below. Additionally, each device 110, 115, 120*a-b* may include an address/data bus 924, 1024 for conveying data among components of the respective device. Each component within a device 110, 115, 120*a-b* may also be directly connected to other components in addition to (or instead of) being connected to other components across the bus 924, 1024.

Referring to FIG. 9, the device 110, 115 may include input/output device interfaces 902 that connect to a variety of components such as an audio output component such as a speaker(s) 918, a wired headset or a wireless headset (not illustrated), or other component capable of outputting audio. The device 110, 115 may also include an audio capture component. The audio capture component may be, for example, a microphone 920 or array of microphones, a wired headset or a wireless headset (not illustrated), etc. The microphone(s) 920 may be configured to capture audio. If an array of microphones 918 is included, approximate distance to a sound's point of origin may be determined by acoustic localization based on time and amplitude differences between sounds captured by different microphones of the array.

Via antenna(s) 914, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment.

As noted above, multiple devices may be employed in a single speech processing system 100. In such a multi-device system, each of the devices may include different components for performing different aspects of the speech processing. The multiple devices may include overlapping components. The components of the device(s) 110, 115 and the server(s) 120, as illustrated in FIGS. 9 and 10, are exemplary, and may be located as a stand-alone device or may be included, in whole or in part, as a component of a larger device or system.

Figure 11:
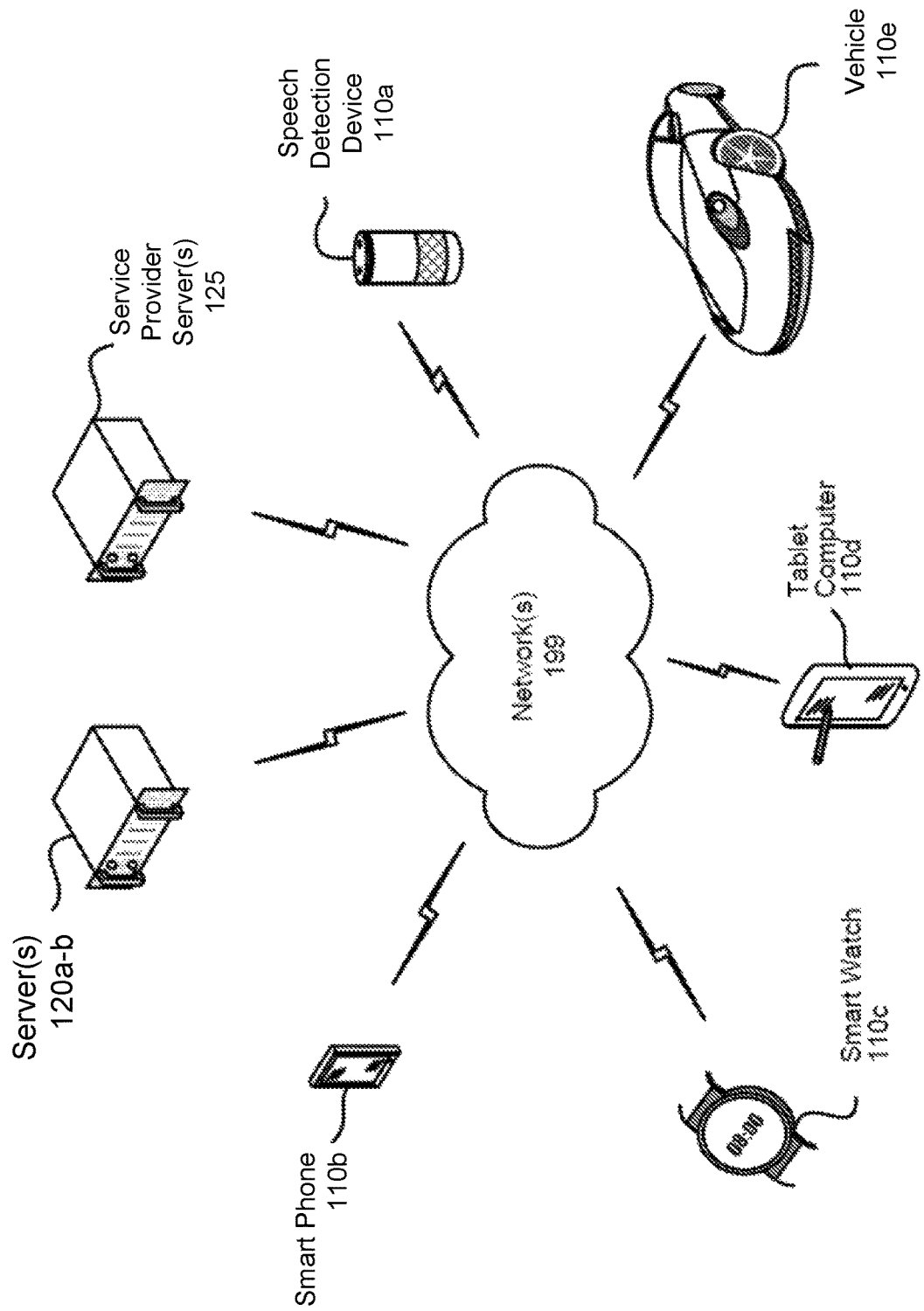
FIG. 11 illustrates an example of a computer network for use with the speech processing system.

As illustrated in FIG. 11, multiple devices (110*a*-110*e*, 120, 125) may contain components of the system 100 and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, and/or a vehicle 110*e* may be connected to the network(s) 199 through a wireless service provider, over a Wi-Fi or cellular network connection, or the like. Other devices are included as network-connected support devices, such as the server(s) 120, the service provider server(s) 125, or others. The support devices may connect to the network(s) 199 through a wired connection or wireless connection. Networked devices may capture audio using one-or-more built-in or connected microphones or audio capture devices, with processing performed by ASR, NLU, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first message data from a mobile phone associated with an unverified phone number;
   generating a first verification code;
   generating first audio data comprising a representation of a first digital signature based on at least the first verification code;
   sending a message comprising second message data to the unverified phone number of the mobile phone, wherein the second message data comprises a link to the first audio data;
   receiving input data from a speech-detection device that is associated with a user account;
   determining the input data represents a command to initiate a verification operation to verify the unverified phone number;
   responsive to determining the input data represents the command, receiving, from the speech-detection device, second audio data representing the first audio data responsive to the mobile phone playing the first audio data within a threshold distance of the speech-detection device;
   determining that the second audio data comprises an audio representation of a second digital signature based on at least the first verification code;
   verifying the unverified phone number; and
   associating the phone number with the user account to indicate that the phone number is verified.

2. The computer-implemented method of claim 1, wherein the first message data comprises a short message service (SMS) message generated by an application on the mobile phone, and wherein the second message data further comprises text.

3. The computer-implemented method of claim 1, wherein:
   generating the first audio data comprises:
      generating a key from a key space using a key generation algorithm, the key space comprising a set number of possible values for the key; and
      applying a cryptographic hash function to the first verification code using the key to generate the first digital signature; and
   determining that the second audio data comprises the audio representation of the second digital signature comprises:
      processing the second audio data using a decoder to generate a value; and
      applying the cryptographic hash function to the value using the key to generate the second digital signature.

4. A system comprising:
   at least one processor; and
   at least one memory including instructions that, when executed by the at least one processor, cause the system to:
      receive first message data associated with a user account from a mobile phone, wherein the first message data is associated with contact data, the contact data comprising an unverified phone number of the mobile phone;
      generate a first verification code;
      generate first audio data comprising a representation of a first digital signature based on at least the first verification code;
      send, to the unverified phone number of the mobile phone, second message data comprising at least one of the first audio data or a link to the first audio data;
      receive input data from a second device that is associated with the user account;
      determine the input data represents a command to initiate a verification operation to verify the unverified phone number;
      responsive to the input data representing the command, receive second audio data from the second device;
      determine that the second audio data comprises an audio representation of a second digital signature based on at least the first verification code;
      verify the unverified phone number; and associate the contact data with the user account, wherein association of the contact data with the user account indicates that the phone number is verified.

5. The system of claim 4, wherein the contact data further comprises at least one of an internet protocol address, an email address, a physical address, or an additional user account associated with a third party service.

6. The system of claim 4, wherein the first message data comprises a first text message and the second message data comprises a second text message.

7. The system of claim 4, wherein the second device represents an approved device for the user account, and wherein the instructions, when executed by the at least one processor, further cause the system to:
determine that the mobile phone is within a threshold proximity of the approved device because the second device generated the second audio data representing the first audio data that was sent to the mobile phone.

8. The system of claim 4, wherein the instructions, when executed by the at least one processor, further cause the system to:
determine an identity of a speaker of a voice command based on the input data, the input data representing audio of an utterance comprising the voice command of the command; and
authenticate the speaker.

9. The system of claim 4, wherein the first message data comprises a first instance of a nonce, and wherein the instructions, when executed by the at least one processor, further cause the system to:
receive, from the mobile phone, a notice of a verification request associated with the first message data, the notice comprising a second instance of the nonce;
determine that the first instance of the nonce matches the second instance of the nonce; and
verify the first message data.

10. The system of claim 4, wherein the instructions, when executed by the at least one processor, further cause the system to:
generate the first audio data by performing the following comprising:
generate a key from a key space using a key generation algorithm; and
apply a cryptographic hash function to the first verification code using the key to generate the first digital signature; and
determine that the second audio data comprises the second digital signature by processing the second audio data using a decoder to generate a value and applying the cryptographic hash function to the value using the key to generate the second digital signature.

11. The system of claim 4, wherein the second audio data has an ultrasonic frequency range of above 20,000 Hz, and wherein the instructions, when executed by the at least one processor, further cause the system to
combine the second audio data with the input data, wherein the input data comprises one or more sounds having an audible frequency range of 20-20,000 Hz.

12. A computer-implemented method comprising:
receiving first message data associated with a user account from a mobile phone, wherein the first message data is associated with contact data, the contact data comprising an unverified phone number of the mobile phone;
generating a first verification code;
generating first audio data comprising a representation of a first digital signature based on at least the first verification code;
sending, to the unverified phone number of the mobile phone, second message data comprising at least one of the first audio data or a link to the first audio data;
receiving input data from a second device that is associated with the user account;
determining the input data represents a command to initiate a verification operation to verify the unverified phone number;
responsive to the determining the input data represents the command, receiving second audio data from the second device;
determining that the second audio data comprises an audio representation of a second digital signature based on at least the first verification code;
verifying the unverified phone number; and
associating the contact data with the user account, wherein association of the contact data with the user account indicates that the phone number is verified.

13. The computer-implemented method of claim 12, wherein the contact data further comprises at least one of an internet protocol address, an email address, a physical address, or an additional user account associated with a third party service.

14. The computer-implemented method of claim 13, wherein the first message data comprises a short message service (SMS) message, and wherein the second device is a speech-detection device.

15. The computer-implemented method of claim 12, wherein at least one of the mobile phone or the second device represents an approved device for the user account, the method further comprising:
determining that the mobile phone is within a threshold proximity of the second device because the second device generated the second audio data.

16. The computer-implemented method of claim 12, further comprising:
determining an identity of a speaker of a voice command based on the input data, the input data representing audio of an utterance comprising the voice command of the command; and
authenticating the speaker.

17. The computer-implemented method of claim 12, wherein the first message data comprises a first instance of a nonce, the method further comprising:
receiving, from the mobile phone, a notice of a verification request associated with the first message data, the notice comprising a second instance of the nonce;
determining that the first instance of the nonce matches the second instance of the nonce; and
verifying the first message data.

18. The computer-implemented method of claim 12, wherein:
generating the first audio data comprises:
generating a key from a key space using a key generation algorithm; and
applying a cryptographic hash function to the first verification code using the key to generate the first digital signature; and
determining that the second audio data comprises the second digital signature comprises processing the second audio data using a decoder to generate a value and applying the cryptographic hash function to the value using the key to generate the second digital signature.

19. The computer-implemented method of claim 12, wherein the second audio data has an ultrasonic frequency range of above 20,000 Hz, the method further comprising combining the second audio data with the input data, wherein the input data comprises one or more sounds having an audible frequency range of 20-20,000 Hz.

20. The computer-implemented method of claim 12, wherein the first message data comprises a reference to the contact data.

* * * * *